(12) United States Patent
Ehrhart et al.

(10) Patent No.: US 7,413,127 B2
(45) Date of Patent: Aug. 19, 2008

(54) OPTICAL READER FOR CLASSIFYING AN IMAGE

(75) Inventors: Michael Ehrhart, Liverpool, NY (US); Andrew Longacre, Jr., Skaneateles, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 11/592,636

(22) Filed: Nov. 3, 2006

(65) Prior Publication Data

US 2007/0051814 A1    Mar. 8, 2007

Related U.S. Application Data

(60) Division of application No. 10/764,741, filed on Jan. 26, 2004, which is a continuation of application No. 09/904,697, filed on Jul. 31, 2001, now Pat. No. 6,722,569.

(51) Int. Cl.
  *G06K 7/10* (2006.01)
(52) U.S. Cl. ............... 235/462.2; 235/462.01
(58) Field of Classification Search ...............
  235/462.01–462.47, 472.01, 472.02, 472.03, 235/470, 454
See application file for complete search history.

(56) References Cited

U.S. PATENT DOCUMENTS

| 3,684,868 | A | 8/1972 | Christie et al. |
|---|---|---|---|
| 3,716,699 | A | 2/1973 | Eckert, Jr. et al. |
| 3,801,775 | A | 4/1974 | Acker et al. |
| 3,902,047 | A | 8/1975 | Tyler et al. |
| 4,020,463 | A | 4/1977 | Himmel |
| 4,286,255 | A | 8/1981 | Siy |
| 4,335,303 | A | 6/1982 | Call |
| 4,387,298 | A | 6/1983 | Petersen et al. |
| 4,499,372 | A | 2/1985 | Nakano et al. |
| 4,516,017 | A | 5/1985 | Hara et al. |
| 4,530,584 | A | 7/1985 | Schmidt |
| 4,544,064 | A | 10/1985 | Felder et al. |

(Continued)

FOREIGN PATENT DOCUMENTS

EP    0350933    1/1990

(Continued)

OTHER PUBLICATIONS

Langer, G., Siemens AG, Munchen, West Germany, Data Report, vol. 18, No. 4, Aug. 1983, pp. 32-33, West Germany, Hand-Held Scanner for OCR and Bar Code Abstract (1 pg.).

(Continued)

*Primary Examiner*—Thien M Le
(74) *Attorney, Agent, or Firm*—Marjama Muldoon Blasiak & Sullivan LLP

(57) ABSTRACT

An optical reader that is configured for classifying an image. The optical reader includes an image analysis component that is configured for classifying the image by evaluating a result of attempting to locate and process a portion of the image as graphical symbol, and configured for classifying the image as an image including a graphic symbol if and when attempting to locate and process a portion of the image as graphical symbol is successful, and configured for classifying the image as an image excluding a graphic symbol if and when attempting to locate and process a portion of the image as graphical symbol is unsuccessful.

20 Claims, 17 Drawing Sheets

U.S. PATENT DOCUMENTS

| | | |
|---|---|---|
| 4,562,592 A | 12/1985 | Chainer et al. |
| 4,581,762 A | 4/1986 | Lapidus et al. |
| 4,588,211 A | 5/1986 | Greene |
| 4,656,591 A | 4/1987 | Goldberg |
| 4,760,248 A | 7/1988 | Swartz et al. |
| 4,776,464 A | 10/1988 | Miller et al. |
| 4,794,239 A | 12/1988 | Allais |
| 4,806,776 A | 2/1989 | Kley |
| 4,832,204 A | 5/1989 | Handy et al. |
| 4,835,372 A | 5/1989 | Gombrich et al. |
| 4,855,842 A | 8/1989 | Hayes et al. |
| 4,858,000 A | 8/1989 | Lu |
| 4,868,757 A | 9/1989 | Gil |
| 4,873,426 A | 10/1989 | Sarna et al. |
| 4,877,948 A | 10/1989 | Krueger |
| 4,877,949 A | 10/1989 | Danielson et al. |
| 4,924,078 A | 5/1990 | Sant'Anselmo et al. |
| 4,948,955 A | 8/1990 | Lee et al. |
| 4,963,756 A | 10/1990 | Quan et al. |
| 4,972,494 A | 11/1990 | White et al. |
| 4,983,818 A | 1/1991 | Knowles |
| 5,010,241 A | 4/1991 | Butterworth |
| 5,019,699 A | 5/1991 | Koenck |
| 5,038,391 A | 8/1991 | Yamaguchi et al. |
| 5,039,847 A | 8/1991 | Morii et al. |
| 5,043,908 A | 8/1991 | Manduley et al. |
| 5,050,223 A | 9/1991 | Sumi et al. |
| 5,054,102 A | 10/1991 | Gaborski |
| 5,091,975 A | 2/1992 | Berger et al. |
| 5,102,110 A | 4/1992 | Reynolds |
| 5,103,489 A | 4/1992 | Miette et al. |
| 5,119,433 A | 6/1992 | Will |
| 5,120,940 A | 6/1992 | Willsie |
| 5,134,669 A | 7/1992 | Keogh et al. |
| 5,138,140 A | 8/1992 | Siemiatkowski et al. |
| 5,138,141 A | 8/1992 | Blanford et al. |
| 5,180,904 A | 1/1993 | Shepard et al. |
| 5,199,081 A | 3/1993 | Saito et al. |
| 5,199,084 A | 3/1993 | Kishi et al. |
| 5,212,777 A | 5/1993 | Gove et al. |
| 5,237,161 A | 8/1993 | Grodevant |
| 5,237,625 A | 8/1993 | Yamashita et al. |
| 5,243,655 A | 9/1993 | Wang |
| 5,260,554 A | 11/1993 | Grodevant |
| 5,262,623 A | 11/1993 | Batterman et al. |
| 5,262,871 A | 11/1993 | Wilder et al. |
| 5,278,399 A | 1/1994 | Sano et al. |
| 5,291,243 A | 3/1994 | Heckman et al. |
| 5,296,689 A | 3/1994 | Reddersen et al. |
| 5,296,690 A | 3/1994 | Chandler et al. |
| 5,296,960 A | 3/1994 | Ellingson et al. |
| 5,299,116 A | 3/1994 | Owens et al. |
| 5,301,243 A | 4/1994 | Olschafskie et al. |
| 5,304,423 A | 4/1994 | Niknafs et al. |
| 5,304,786 A | 4/1994 | Pavlidis et al. |
| 5,305,122 A | 4/1994 | Hayashi et al. |
| 5,307,423 A | 4/1994 | Gupta et al. |
| 5,313,051 A | 5/1994 | Brigida et al. |
| 5,317,388 A | 5/1994 | Surka et al. |
| 5,331,151 A | 7/1994 | Cochran et al. |
| 5,331,176 A | 7/1994 | Sant' Anselmo et al. |
| 5,337,361 A | 8/1994 | Wang et al. |
| 5,354,977 A | 10/1994 | Roustaei |
| 5,365,048 A | 11/1994 | Komiya et al. |
| 5,375,226 A | 12/1994 | Sano et al. |
| 5,378,883 A | 1/1995 | Batterman et al. |
| 5,392,447 A | 2/1995 | Schlack et al. |
| 5,396,054 A | 3/1995 | Krichever et al. |
| 5,399,846 A | 3/1995 | Pavlidis et al. |
| 5,410,141 A | 4/1995 | Koenck et al. |
| 5,413,383 A | 5/1995 | Laurash et al. |
| 5,414,251 A | 5/1995 | Durbin |
| 5,420,403 A | 5/1995 | Allum et al. |
| 5,420,943 A | 5/1995 | Mak |
| 5,421,778 A | 6/1995 | Kouramanis et al. |
| 5,422,470 A | 6/1995 | Kubo et al. |
| 5,428,211 A | 6/1995 | Zheng et al. |
| 5,428,212 A | 6/1995 | Tani et al. |
| 5,448,375 A | 9/1995 | Cooper et al. |
| 5,449,201 A | 9/1995 | Miller et al. |
| 5,467,403 A | 11/1995 | Fishbine et al. |
| 5,467,411 A | 11/1995 | Tanaka et al. |
| 5,471,533 A | 11/1995 | Wang et al. |
| 5,489,158 A | 2/1996 | Wang et al. |
| 5,489,769 A | 2/1996 | Kubo et al. |
| 5,496,992 A | 3/1996 | Madan et al. |
| 5,504,322 A | 4/1996 | Pavlidis et al. |
| 5,504,367 A | 4/1996 | Arackellian et al. |
| 5,506,697 A | 4/1996 | Li et al. |
| 5,508,818 A | 4/1996 | Hamma |
| 5,513,017 A | 4/1996 | Knodt et al. |
| 5,513,264 A | 4/1996 | Wang et al. |
| 5,521,366 A | 5/1996 | Wang et al. |
| 5,550,364 A | 8/1996 | Rudeen |
| 5,550,366 A | 8/1996 | Roustaei |
| 5,557,091 A | 9/1996 | Krummel |
| 5,557,095 A | 9/1996 | Clark et al. |
| 5,557,519 A | 9/1996 | Morita et al. |
| 5,570,135 A | 10/1996 | Gove et al. |
| 5,574,519 A | 11/1996 | Manico et al. |
| 5,581,636 A | 12/1996 | Skinger |
| 5,591,955 A | 1/1997 | Laser |
| 5,591,956 A | 1/1997 | Longacre, Jr. et al. |
| 5,598,007 A | 1/1997 | Bunce et al. |
| 5,602,382 A | 2/1997 | Ulvr et al. |
| 5,607,187 A | 3/1997 | Salive et al. |
| 5,617,481 A | 4/1997 | Nakamura et al. |
| 5,627,915 A | 5/1997 | Rosser et al. |
| 5,635,694 A | 6/1997 | Tuhro |
| 5,635,697 A | 6/1997 | Shellhammer et al. |
| 5,642,442 A | 6/1997 | Morton et al. |
| 5,644,408 A | 7/1997 | Li et al. |
| 5,646,390 A | 7/1997 | Wang et al. |
| 5,654,533 A | 8/1997 | Suzuki et al. |
| 5,659,167 A | 8/1997 | Wang et al. |
| 5,668,803 A | 9/1997 | Tymes et al. |
| 5,684,290 A | 11/1997 | Arackellian et al. |
| 5,691,527 A | 11/1997 | Hara et al. |
| 5,697,504 A | 12/1997 | Hiramatsu et al. |
| 5,702,059 A | 12/1997 | Chu et al. |
| 5,703,349 A | 12/1997 | Meyerson et al. |
| 5,708,515 A | 1/1998 | Nishiura et al. |
| 5,710,419 A | 1/1998 | Wang et al. |
| 5,714,745 A | 2/1998 | Ju et al. |
| 5,723,868 A | 3/1998 | Hammond, Jr. et al. |
| 5,726,981 A | 3/1998 | Ylitervo et al. |
| 5,734,153 A | 3/1998 | Swartz et al. |
| 5,756,981 A | 5/1998 | Roustaei et al. |
| 5,760,382 A | 6/1998 | Li et al. |
| 5,761,686 A | 6/1998 | Bloomberg |
| 5,763,866 A | 6/1998 | Seo et al. |
| 5,770,841 A | 6/1998 | Moed et al. |
| 5,773,806 A | 6/1998 | Longacre, Jr. |
| 5,773,810 A | 6/1998 | Hussey et al. |
| 5,780,834 A | 7/1998 | Havens et al. |
| 5,783,811 A | 7/1998 | Feng et al. |
| 5,786,586 A | 7/1998 | Pidhirny et al. |
| 5,793,033 A | 8/1998 | Feng et al. |
| 5,796,090 A | 8/1998 | Pavlidis et al. |
| 5,801,371 A | 9/1998 | Kahn et al. |
| 5,804,805 A | 9/1998 | Koenck et al. |
| 5,811,784 A | 9/1998 | Tausch et al. |
| 5,815,200 A | 9/1998 | Ju et al. |
| 5,818,028 A | 10/1998 | Meyerson et al. |

| | | | | | | |
|---|---|---|---|---|---|---|
| 5,818,528 | A | 10/1998 | Roth et al. | 6,285,916 | B1 | 9/2001 | Kadaba et al. |
| 5,821,518 | A | 10/1998 | Sussmeier et al. | 6,286,760 | B1 | 9/2001 | Schmidt et al. |
| 5,821,523 | A | 10/1998 | Bunte et al. | 6,290,132 | B1 | 9/2001 | Dickson et al. |
| 5,825,002 | A | 10/1998 | Roslak | 6,292,181 | B1 | 9/2001 | Banerjee et al. |
| 5,834,754 | A | 11/1998 | Feng et al. | 6,298,176 | B2 | 10/2001 | Longacre, Jr. et al. |
| 5,837,986 | A | 11/1998 | Barile et al. | 6,304,313 | B1 | 10/2001 | Honma et al. |
| 5,841,121 | A | 11/1998 | Koenck | 6,304,660 | B1 | 10/2001 | Ehrhart et al. |
| 5,844,227 | A | 12/1998 | Schmidt et al. | 6,311,896 | B1 | 11/2001 | Mulla et al. |
| 5,857,029 | A | 1/1999 | Patel | 6,315,204 | B1 | 11/2001 | Knighton et al. |
| 5,867,595 | A | 2/1999 | Cymbalski | 6,321,992 | B1 | 11/2001 | Knowles et al. |
| 5,869,828 | A | 2/1999 | Braginsky | 6,330,975 | B1 | 12/2001 | Bunte et al. |
| 5,877,487 | A | 3/1999 | Tani et al. | 6,336,587 | B1 | 1/2002 | He et al. |
| 5,880,453 | A | 3/1999 | Wang et al. | 6,340,114 | B1 | 1/2002 | Correa et al. |
| 5,886,338 | A | 3/1999 | Arackellian et al. | 6,347,163 | B2 | 2/2002 | Roustaei |
| 5,892,824 | A | 4/1999 | Beatson et al. | 6,357,662 | B1 | 3/2002 | Helton et al. |
| 5,914,476 | A | 6/1999 | Gerst, III et al. | 6,373,507 | B1 | 4/2002 | Camara et al. |
| 5,917,925 | A | 6/1999 | Moore | 6,375,075 | B1 | 4/2002 | Ackley et al. |
| 5,917,945 | A | 6/1999 | Cymbalski | 6,384,907 | B1 | 5/2002 | Gooch et al. |
| 5,920,056 | A | 7/1999 | Bonnet | 6,398,112 | B1 | 6/2002 | Li et al. |
| 5,929,418 | A | 7/1999 | Ehrhart et al. | 6,405,929 | B1 | 6/2002 | Ehrhart et al. |
| 5,936,609 | A | 8/1999 | Matsuoka et al. | 6,418,325 | B1 | 7/2002 | Reber et al. |
| 5,942,743 | A | 8/1999 | Schmidt et al. | 6,419,157 | B1 | 7/2002 | Ehrhart et al. |
| 5,945,661 | A | 8/1999 | Nukui et al. | 6,460,766 | B1 | 10/2002 | Olschafskie et al. |
| 5,949,052 | A | 9/1999 | Longacre, Jr. et al. | 6,494,375 | B1 | 12/2002 | Ishibashi et al. |
| 5,949,053 | A | 9/1999 | Zlotnick et al. | 6,512,218 | B1 | 1/2003 | Canini et al. |
| 5,949,057 | A | 9/1999 | Feng | 6,512,541 | B2 | 1/2003 | Dunton et al. |
| 5,965,863 | A | 10/1999 | Parker et al. | 6,533,168 | B1 | 3/2003 | Ching |
| 5,974,202 | A | 10/1999 | Wang et al. | 6,539,360 | B1 | 3/2003 | Kadaba |
| 5,990,744 | A | 11/1999 | Nagaraj | 6,556,242 | B1 | 4/2003 | Dunton et al. |
| 5,992,744 | A | 11/1999 | Smith et al. | 6,561,428 | B2 | 5/2003 | Meier et al. |
| 5,992,753 | A | 11/1999 | Xu | 6,572,020 | B2 | 6/2003 | Barkan |
| 6,000,612 | A | 12/1999 | Xu | 6,575,367 | B1 | 6/2003 | Longacre, Jr. |
| 6,002,491 | A | 12/1999 | Li et al. | 6,598,798 | B1 | 7/2003 | Kashi et al. |
| 6,010,073 | A | 1/2000 | Bianchi et al. | 6,621,598 | B1 | 9/2003 | Oda et al. |
| 6,011,873 | A | 1/2000 | Desai et al. | 6,629,642 | B1 | 10/2003 | Swartz et al. |
| 6,015,088 | A | 1/2000 | Parker et al. | 6,637,658 | B2 | 10/2003 | Barber et al. |
| 6,019,286 | A | 2/2000 | Li et al. | 6,641,046 | B2 | 11/2003 | Durbin |
| 6,024,284 | A | 2/2000 | Schmid et al. | 6,651,060 | B1 | 11/2003 | Harper et al. |
| 6,036,095 | A | 3/2000 | Seo et al. | 6,655,597 | B1 | 12/2003 | Swartz et al. |
| 6,055,552 | A | 4/2000 | Curry | 6,678,425 | B1 | 1/2004 | Flores et al. |
| 6,060,722 | A | 5/2000 | Havens et al. | 6,681,994 | B1 | 1/2004 | Koenck |
| 6,062,475 | A | 5/2000 | Feng | 6,688,523 | B1 | 2/2004 | Koenck |
| 6,070,805 | A | 6/2000 | Kaufman et al. | 6,694,366 | B1 | 2/2004 | Gernert et al. |
| 6,075,240 | A | 6/2000 | Watanabe et al. | 6,695,209 | B1 | 2/2004 | La |
| 6,076,731 | A | 6/2000 | Terrell | 6,703,633 | B2 | 3/2004 | Tullis |
| 6,076,733 | A | 6/2000 | Wilz, Sr. et al. | 6,722,569 | B2 * | 4/2004 | Ehrhart et al. ............. 235/469 |
| 6,076,738 | A | 6/2000 | Bloomberg et al. | 6,736,322 | B2 | 5/2004 | Gobburu et al. |
| 6,081,827 | A | 6/2000 | Reber et al. | 6,738,092 | B1 | 5/2004 | Nakagawa et al. |
| 6,089,455 | A | 7/2000 | Yagita et al. | 6,746,164 | B1 | 6/2004 | Albright et al. |
| 6,094,509 | A | 7/2000 | Zheng et al. | 6,752,319 | B2 | 6/2004 | Ehrhart et al. |
| 6,095,418 | A | 8/2000 | Swartz et al. | 6,758,403 | B1 | 7/2004 | Keys et al. |
| 6,098,887 | A | 8/2000 | Figarella et al. | 6,766,053 | B2 | 7/2004 | Fan et al. |
| 6,101,487 | A | 8/2000 | Yeung et al. | 6,772,949 | B2 | 8/2004 | Wilz, Sr. et al. |
| 6,102,295 | A | 8/2000 | Ogami | 6,783,069 | B1 | 8/2004 | Hecht et al. |
| 6,105,871 | A | 8/2000 | Campo et al. | 6,786,069 | B2 | 9/2004 | Ochi et al. |
| 6,108,612 | A | 8/2000 | Vescovi et al. | 6,811,088 | B2 | 11/2004 | Lanzaro et al. |
| 6,115,513 | A | 9/2000 | Miyazaki et al. | 6,827,273 | B2 | 12/2004 | Wilz, Sr. et al. |
| 6,122,410 | A | 9/2000 | Zheng et al. | 6,832,725 | B2 | 12/2004 | Gardiner et al. |
| 6,123,261 | A | 9/2000 | Roustaei | 6,834,807 | B2 | 12/2004 | Ehrhart et al. |
| 6,129,278 | A | 10/2000 | Wang et al. | 6,877,664 | B1 | 4/2005 | Oliva et al. |
| 6,133,951 | A | 10/2000 | Miyadera et al. | 6,889,904 | B2 | 5/2005 | Bianculli et al. |
| 6,149,063 | A | 11/2000 | Reynolds et al. | 6,910,633 | B2 | 6/2005 | Swartz et al. |
| 6,155,491 | A | 12/2000 | Dueker et al. | 6,942,151 | B2 | 9/2005 | Ehrhart |
| 6,157,027 | A | 12/2000 | Watanabe et al. | 6,976,626 | B2 | 12/2005 | Schmidt et al. |
| 6,186,404 | B1 | 2/2001 | Ehrhart et al. | 6,976,631 | B2 | 12/2005 | Kashi et al. |
| 6,189,796 | B1 | 2/2001 | Itoh et al. | 7,068,821 | B2 | 6/2006 | Matsutani et al. |
| 6,195,122 | B1 | 2/2001 | Vincent | 7,111,787 | B2 | 9/2006 | Ehrhart |
| 6,212,504 | B1 | 4/2001 | Hayosh | 7,121,468 | B2 | 10/2006 | Schmidt et al. |
| 6,220,509 | B1 | 4/2001 | Byford et al. | 7,222,789 | B2 | 5/2007 | Longacre, Jr. et al. |
| 6,223,988 | B1 | 5/2001 | Batterman et al. | 7,287,697 | B2 | 10/2007 | Ehrhart et al. |
| 6,234,394 | B1 | 5/2001 | Kahn et al. | 7,293,712 | B2 | 11/2007 | Wang |
| 6,262,804 | B1 | 7/2001 | Friend et al. | 7,303,134 | B2 | 12/2007 | Ehrhart et al. |
| 6,283,375 | B1 | 9/2001 | Wilz, Sr. et al. | 2002/0039099 | A1 | 4/2002 | Harper |

| | | | |
|---|---|---|---|
| 2003/0062419 A1* | 4/2003 | Ehrhart et al. | 235/469 |
| 2003/0127519 A1* | 7/2003 | Ehrhart et al. | 235/469 |
| 2005/0001035 A1 | 1/2005 | Hawley et al. | |
| 2005/0008263 A1* | 1/2005 | Nagahashi et al. | 382/305 |
| 2005/0056699 A1 | 3/2005 | Meier et al. | |
| 2005/0161511 A1 | 7/2005 | Parker et al. | |
| 2005/0167507 A1 | 8/2005 | Swartz et al. | |
| 2006/0274171 A1 | 12/2006 | Wang | |

FOREIGN PATENT DOCUMENTS

| | | |
|---|---|---|
| EP | 0392159 | 10/1990 |
| EP | 0439682 | 8/1991 |
| EP | 0498366 A3 | 8/1992 |
| EP | 0690403 A2 | 1/1996 |
| EP | 0733991 | 9/1996 |
| EP | 0910032 A2 | 4/1999 |
| EP | 0917087 A1 | 5/1999 |
| EP | 0978990 A2 | 2/2000 |
| EP | 0998147 | 5/2000 |
| EP | 0999514 | 5/2000 |
| EP | 01050793 | 11/2000 |
| GB | 2357209 A | 6/2001 |
| JP | 61059569 | 3/1986 |
| JP | 63311474 | 12/1988 |
| JP | 01216486 | 8/1989 |
| JP | 03020058 | 1/1991 |
| JP | 03054680 | 3/1991 |
| JP | 04257844 | 9/1992 |
| JP | 06250775 | 9/1994 |
| JP | 10224773 | 8/1998 |
| JP | 11232378 | 8/1999 |
| JP | 2000050028 A | 2/2000 |
| JP | 2000293622 A | 10/2000 |
| WO | WO-9202371 | 2/1992 |
| WO | WO-9217861 | 10/1992 |
| WO | WO-9513196 | 5/1995 |
| WO | WO-9524278 | 9/1995 |
| WO | WO-9534043 | 12/1995 |
| WO | WO-9639676 | 12/1996 |
| WO | WO-9708647 | 3/1997 |
| WO | WO-9950736 | 10/1999 |
| WO | WO-0016241 A1 | 3/2000 |
| WO | WO-0072246 | 11/2000 |
| WO | WO-0122358 | 3/2001 |
| WO | WO-0146899 A3 | 6/2001 |
| WO | WO-02080520 | 10/2002 |
| WO | WO-03001435 | 1/2003 |
| WO | WO-03081520 | 10/2003 |
| WO | WO-03081521 | 10/2003 |
| WO | WO-2004064382 A1 | 7/2004 |

OTHER PUBLICATIONS

Berge, Paul, George Washington University SFX, Data Processing, Guildford: Nov. 1984, vol. 26, Issue 9, p. 28, ProQuest Document View—Using Bar Code Systems For Product Identification, (1 pg.).
Dilling, Richard, George Washington University SFX, Systems International, London, Apr. 1984, vol. 12, Issue 4, p. 57, ProQuest Document View—Bar Codes: Designing In (1 pg.).
McDonald, Richard A., George Washington University SFX, Industrial Engineering, Norcross, Nov. 1985, vol. 17, Issue 11, p. 70, ProQuest Document View—Bar Code Systems Enhance Productivity of Computer Systems With Real-Time Mode, (1 pg.).
Anonymous, OEP, Tokyo, Sep. 1987, vol. 16, Issue 107, p. 54, ProQuest Document View—Barcode Reader (1 pg.).
Poletti, Therese, Crain's New York Business, New York, Aug. 29, 1988, vol. 4, Issue 35, Section 1, p. 5, ProQuest Document View—Bar Codes Make Symbol's Coffers Sing (3 pgs.).
Forger, Gary, Modern Materials Handling, Boston, Sep. 1989, vol. 44, Issue 9, p. 51, Modern Materials Handling Document Summary—A Course-in-Print Bar Code Systems Basics (1 pg.).
Okamura H, Nakamura T, Fujiwaki K, Besshi S. Kitamura S, Kimura Y, Tahara S, Takayama T., Sumitomo Electric Ind. Ltd., Osaka, Japan, Sumitomo Electric Technical Review, No. 30, Jun. 1990, pp. 125-129, Japan, Development of Hand-Held Computer Terminal With Bar Code Scanner Abstract (1 pg.).
Panchak, Patricia L., Modern Office Technology, v36, n6, p. 44(3), Jun. 1991 Article—Scanners Revolutionize Data/Image Input (6 pgs.).
Snell, Ned, Datamation, Barrington, Apr. 1, 1992, vol. 38, Issue 7, p. 71, ProQuest Document View—Bar Codes Break Out (2 pgs.).
Rowell, Dave, PC Sources, v3, N1, P200(12), Jan. 1992, Article—Easy Entry; Shopping for an Optical Scanner (20 pgs.).
Gonzalez; Woods, "Digital Image Processing," Library of Congress, 10 pg. article, pp. 416-425 and pp. 452-457; Copyright 1992 by Addison Wesley Publishing Company, Inc.
Miyazaki H, Shirakabe K, Otsuki Y, Ono Y, Sugama S, Ishii K, Ind. Autom. Div., NEC Corp., Tokyo, Japan, NEC Research & Development, vol. 34, No. 2, Apr. 1993, pp. 239-247, Japan, Autofocussing Type Barcode Reader OBR-70-7Af with Advanced Beam Forming and Decoding Techniques-Omnidirectional Reading in Great Depth of Field Abstract (1 pg.).
Zhang, Xuesong, Bejing Univ. of Science and Technology, Optical Technique, n2, Mar. 20, 1994, p. 5-10, 29, Engineering Village 2 Abstract—Design of Portable Bar Code Reader (1 pg.).
Anonymous, Manufacturing Systems, Jan. 1995, 13, 1; ABI/Inform Complete, Hand Held Image Scanner A First, (1 pg.).
Sven, H.M. Wang, J.F., Text String Extraction from Images of Colour-Printed Documents—IEEE Proc.—Vis. Image Signal Process., vol. 143, No. 4, Aug. 1996, pp. 210-216.
Martin Adickes; Richard E. Billo, Journal of Manufacturing Systems, 1998, 17, 5, ABI/Inform Complete, Test Protocol For Comparing Two-Dimensional Bar Code Hand-Held Reader Technologies, pp. 361-370.
Edge, Work-Group Computing Report, Nov. 23, 1998 Article—Handheld Computing: NEC Computer Systems Division Announces Newest MobilePro Handheld Personal Computer—the Mobile Pro 800-Product Announcement (4 pgs.).
Michele Pepe, Computer Reseller News, Nov. 15, 1999, 869, ABI/Inform Complete, Two-Dimensional Bar Codes Begin to Make Mark, p. 281.
Tanaka, Yasuya, Satoh, Yoji, Kashi, Motofumi, Fujitsu Scientific and Technical Journal, v. 35, n2, 1999, pp. 267-273, Fujitsu Ltd., Hand-Held Terminal with Multi-Code Reader Abstract (1 pg.).
Spencer, Harvey, Today, Oct. 1999 Article, Using Color for Forms Processing (2 pg.s).
Rakowski, Leo, Modern Machine Shop, Feb. 2001 Article—Getting a Read on 3D Bar Codes, (2 pgs).
International Search Report for International Patent Application No. PCT/US02/15095 dated Nov. 20, 2002.
U.S. Appl. No. 11/592,636, filed Nov. 3, 2006, Michael Ehrhart et al., claim set (3 pgs.).
Notice of Termination of Preprocessing of Ex Parte Reexamination Request (37 CFR 1.510(c)), U. S. Patent No. 6,834,807, Dated May 11, 2007, 2 pages.
Notice of Assignment of Reexamination Request, U. S. Patent No. 6,722,569, Reexamination Control No. 90/008,606, Dated Jun. 11, 2007, 1 page.
USPTO Notice of Reexamination Request Filing Date, U. S. Patent No. 6,722,569, Control No. 90/008,606, Jun. 11, 2007, (1 pg.).
Japanese Office Action for Japanese Patent Application No. 2004-521398, Dated Feb. 5, 2008, 2 pages (accompanied by full text English translation thereof, 3 pages).
Information Summary for Reexamination Control No. 90/008,404 Summary Including: Request for ExParte Reexamination for U.S. Appl. No. 6,722,569 dated Dec. 29, 2006: Notice of Termination Dated Mar. 17, 2006 (sic); Summary Dated Jun. 11, 2008.
Information Summary for Reexamination Control No. 90/008,405 Summary Including: Request for ExParte Reexamination for U.S. Appl. No. 6,834,807 dated Dec. 29, 2006; Sua Sponte Decision Vacating Reexamination Dated May 21, 2007; Summary Dated Jun. 11, 2008.
Information Summary for Reexamination Control No. 90/008,606 Summary Including: Request for ExParte Reexamination for U.S. Appl. No. 6,722,569 dated Apr. 20, 2007; Order Granting Reexamination Request Dated Aug. 22, 2008; Summary Dated Jun. 11, 2008.
Information Summary for Reexamination Control No. 90/008,812 Summary Including: Request for ExParte Reexamination for U.S. Appl. No. 6,834,807 dated Aug. 21, 2007; Response to Notice of Failure to Comply Dated Oct. 24, 2007; Order Granting Reexamination Request Dated Jan. 8, 2008; Summary Dated Jun. 11, 2008.

* cited by examiner

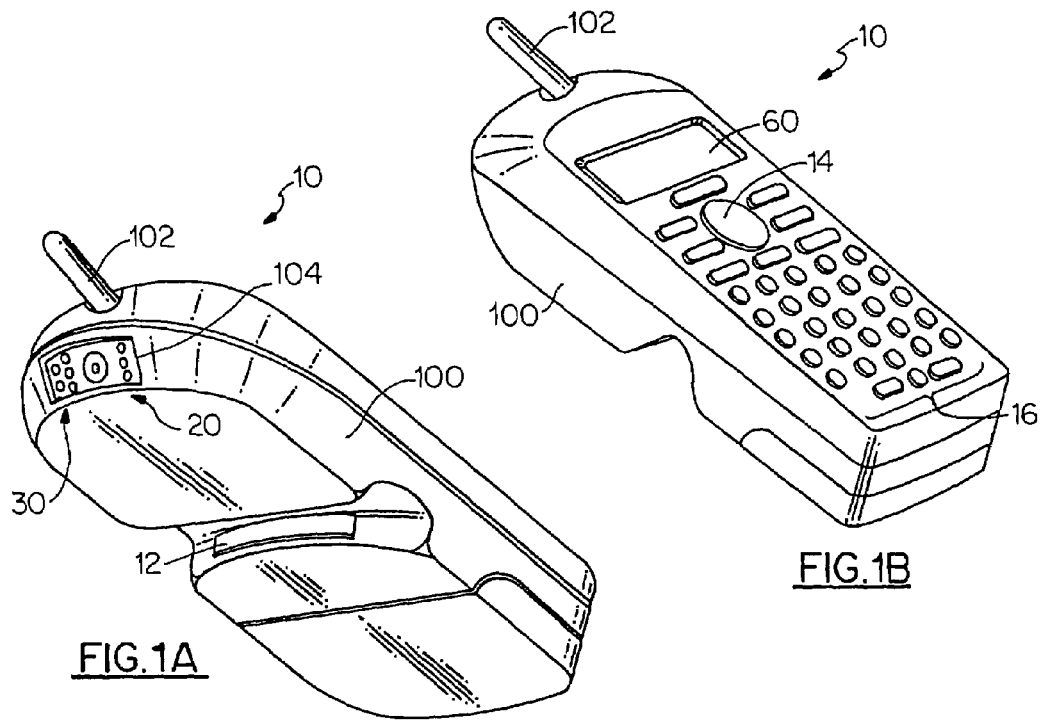
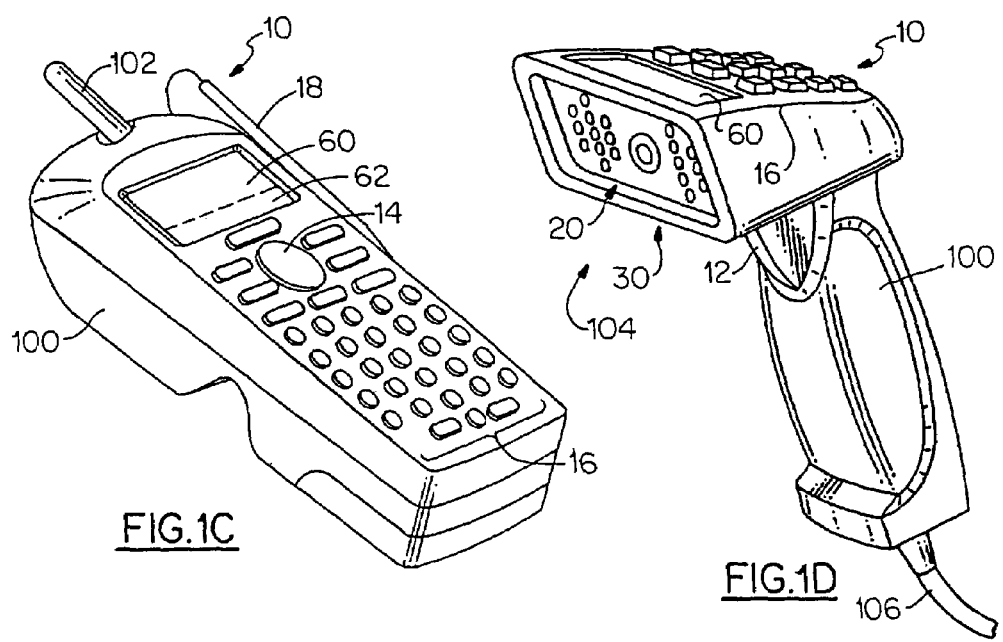

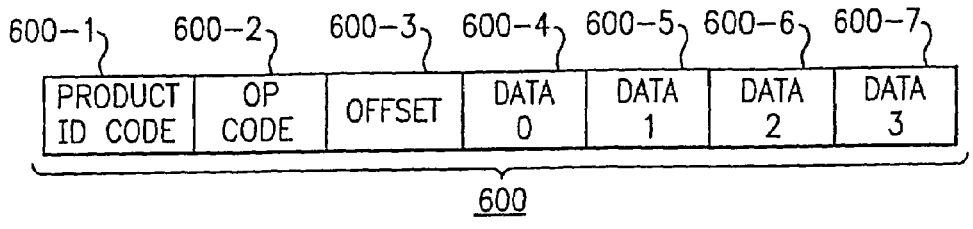

FIG.6A

OPTIONS (OFFSET) TABLE

A. COMMUNICATIONS OPTIONS
 1. RS-232
 2. BAUD RATE
 3. RF LINK
 4. ETHERNET

B. CODE OPTIONS
 1. DISABLE 1D
 2. DISABLE 2D
 3. DISABLE INDIV.
 4. MIN-MAX LENGTH
 5. MULTIPLE SYMBOLS ENABLED

C. SCANNING-DECODING OPTIONS
 1. ONE SHOT
 2. REPEAT UNTIL DONE
 3. REPEAT UNTIL STOPPED
 4. SCAN ON DEMAND
 5. SKIP SCAN
 6. DECODE ON DEMAND

D. OPERATING OPTIONS
 1. BEEPER VOLUME
 2. AIMING LED ON/OFF
 3. AURAL FEEDBACK

E. TRANSMIT OPTIONS
 1. SEND CHECK CHAR'S
 2. SEND CHECKSUM
 3. DATA EDIT OPTIONS

F. READER MODE OPTIONS
 1. AUTOMATIC
 2. SEMI-AUTOMATIC
 3. BAR CODE SCANNING
 4. OCR
 5. SIGNATURE
 6. COLOR IMAGING

FIG.6B

OP CODE TABLE

A. OP CODE "0"-VECTOR PROC.
 1. OUTPUT VERSION OF SOFTWARE
 2. OUTPUT CONTENTS OF PARAMETER TABLE
 3. DISPLAY ENABLED CODES
 4. PRINT PARAMETER TABLE AS BAR CODE SYMBOL

B. OP CODE "1" — CLEAR

C. OP CODE "2" — SET

D. OP CODE "3" — TOGGLE

E. OP CODE "4" — ADD

F. OP CODE "5" — DEFAULT

G. OP CODE "6" — LOAD

H. OP CODE "7" — RESERVED

FIG.6C

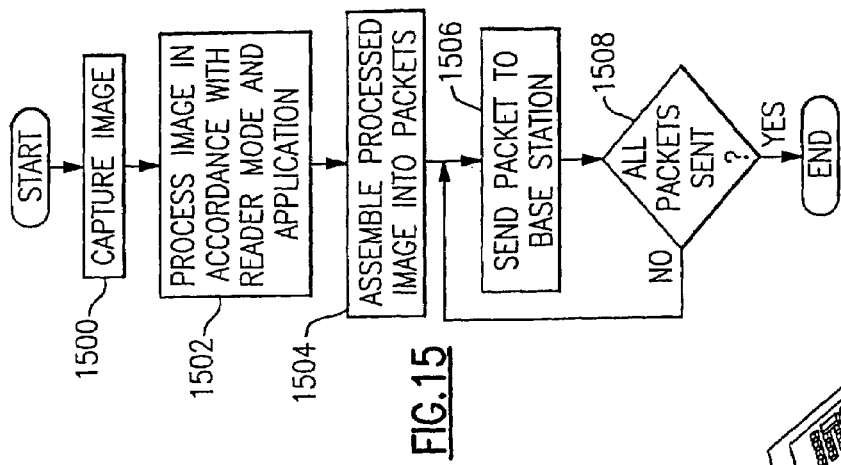
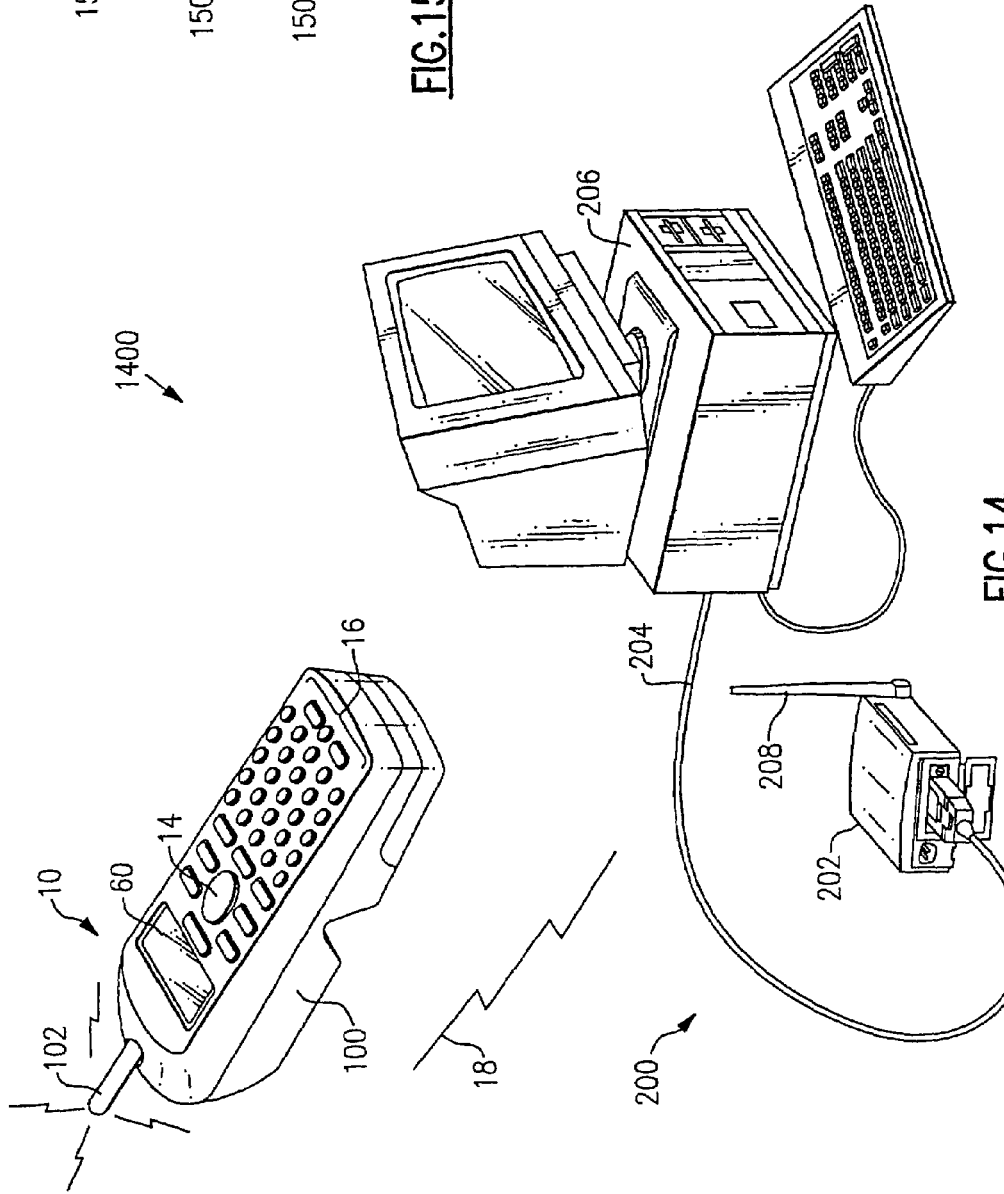

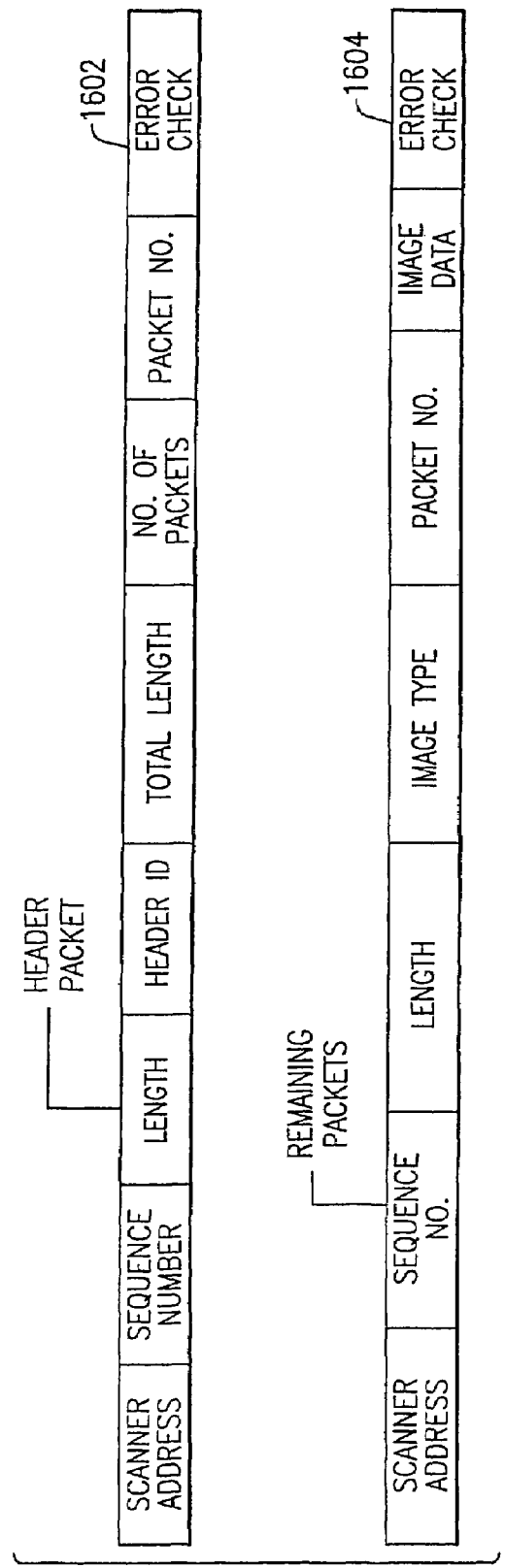

OPTICAL READER FOR CLASSIFYING AN IMAGE

CROSS-REFERENCE TO RELATED APPLICATIONS

This is patent application is a divisional of U.S. patent application Ser. No. 10/764,741 filed on Jan. 26, 2004, which is a continuation of U.S. patent application Ser. No. 09/904,697 filed Jul. 13, 2001 and issued as U.S. Pat. No. 6,722,569 on Apr. 20, 2004, the benefit of priority to the above aforementioned patent applications under 35 U.S.C. §120 is hereby claimed. The content of the above aforementioned applications are relied upon and are incorporated herein by reference in their entirety.

FIELD OF THE INVENTION

The present invention relates generally to optical readers, and particularly to optical readers employing color imagers.

BACKGROUND OF THE INVENTION

Optical indicia readers equipped to read one-dimensional or two-dimensional bar code symbols are well known in the art. There are a number of optical character recognition systems on the market as well. In addition, many financial institutions today employ computer-driven signature capture systems. Many of these systems employ monochrome imagers because monochrome imagers are well-suited to read graphical symbols, such as bar codes, OCR symbols, or signatures.

On the other hand, the ability to provide image capture functionality along with indicia reading in one device is very appealing. Currently, optical readers having image capture functionality use monochrome imagers that provide gray scale images. While such devices are useful, gray scale images are less desirable than color images for viewing purposes. The public has come to expect color imaging. Further, monochrome images are often less distinct and not as informative as color images.

Unfortunately, there are problems associated with using color imaging systems to read graphical symbols. The first problem relates to the difficulty of distinguishing bi-tonal indicia in a color image. Because color imagers provide more information that bi-tonal indicia readers can use, color imaging data is often confusing to graphical symbol indicia readers. One way to solve this problem is to convert the color imaging data into gray-scale data. However, commercially available methods for converting color images to gray-scale are too slow for high-volume scanning. Thus, an optical reader employing a color imager with a gray scale converter would be slower and more expensive than an optical reader using monochrome imager because of the additional processing required.

Thus, a need exists for an inexpensive optical reader that is capable of performing color photography and evaluating graphical symbols. This optical reader must be capable of automatically determining whether an image includes a graphical symbol or is merely a color photographic image, and process the acquired color imaging data based on that determination. A need also exists for an optical reader that is able to associate an acquired color image with any subsequent acquired color image.

SUMMARY OF THE INVENTION

The invention provides for an optical reader that is configured for classifying an image. The optical reader includes a color imaging assembly that is configured for obtaining a representation of an image in a digital format. The optical reader also includes an image analysis component that is configured for classifying the image by evaluating a result of attempting to locate and process a portion of the image as graphical symbol, and configured for classifying the image as an image including a graphic symbol if and when attempting to locate and process a portion of the image as graphical symbol is successful, and configured for classifying the image as an image excluding a graphic symbol if and when attempting to locate and process a portion of the image as graphical symbol is unsuccessful.

In some embodiments, the optical reader is configured to attempt to locate and process a portion of the image as graphical symbol by searching for high energy regions within the image. High energy regions of the image can include black-white transitions.

In some embodiments, the optical reader is configured to attempt to locate and process a portion of the image as graphical symbol by attempting to decode the portion of the image as a bar code symbol. Optionally, if the bar code symbol represents a menu, and if attempting to decode the bar code symbol is successful, then a menu that corresponds to a result of decoding of the bar code symbol is executed. Optionally, if the bar code symbol represents data, and if attempting to decode the bar code symbol is successful, then data that corresponds to a result of decoding the bar code symbol is output to a display.

In some embodiments, if attempting to decode the bar code symbol is unsuccessful, then attempting to process a portion of the image as a graphical symbol further includes attempting to process the portion of the image as an optical character recognition (OCR) symbol.

In some embodiments, if attempting to process the portion of the image as an optical character recognition symbol is successful, then a representation of the processed optical character recognition symbol is stored into a memory.

In some embodiments, if attempting to process the portion of the image as an optical character recognition symbol is unsuccessful, then attempting to process a portion of the image as a graphical symbol further includes attempting to recognize the portion of the image as text. If attempting to recognize the portion of the image as text is successful, then the portion of the image is cropped and stored. Optionally, the portion of the image is further compressed after being cropped and before being stored.

In some embodiments, if attempting to recognize the portion of the image as text is unsuccessful, then attempting to process a portion of the image as a graphical symbol further includes attempting to recognize the portion of the image as a signature. If attempting to recognize the portion of the image as a signature is successful, then the portion of the image is cropped and stored. Optionally, the portion of the image is further compressed after being cropped and before being stored. Optionally, attempting to process a portion of the image as a graphical symbol further includes attempting to verify the signature.

In some embodiments, if attempting to recognize the portion of the image as a signature is unsuccessful, after attempts to decode a bar code symbol, process OCR text and recognize text are unsuccessful, then the image is classified as excluding a graphical symbol.

In some embodiments, attempting to locate and process a portion of the image as graphical symbol is successful if at least one of the steps of attempting to decode a bar code symbol, attempting to process a OCR symbol, attempting to recognize text and attempting to recognize a signature, are successful. Optionally, the image including a graphical symbol, is associated with another image that is subsequently captured. In some embodiments, if attempting to process a portion of the image as graphical symbol is unsuccessful, then the image is classified as an image excluding a graphic symbol.

In another aspect, the invention provides for a method for employing an optical reader to classify an image. In some embodiments, the method includes the steps of providing an optical reader, configuring the optical reader to obtain a representation of an image in a digital format, configuring the optical reader to classify the image by attempting to locate and process a portion of the image as graphical symbol. The method further includes the steps deciding if attempting to locate and process a portion of the image as graphical symbol is successful, then classifying the image as an image including a graphic symbol; and deciding if attempting to locate and process a portion of the image as graphical symbol is unsuccessful, then classifying the image as an image excluding a graphic symbol.

BRIEF DESCRIPTION OF THE DRAWINGS

FIGS. 1A-1D are perspective views of various embodiments of the optical reader of the present invention;

FIG. 6A-6C are graphical depictions of the menu symbol used in the bar code processing flows depicted in FIG. 4 and FIG. 5;

FIG. 14 is a perspective view of a wireless color optical reader in accordance with yet another embodiment of the present invention;

FIG. 15 is a flow chart showing a method for transmitting packetized data from a color optical reader to a base station;

FIGS. 16A and 16B are diagrammatic depictions of packet formats in accordance with yet another embodiment of the present invention;

DETAILED DESCRIPTION

Figure 2:
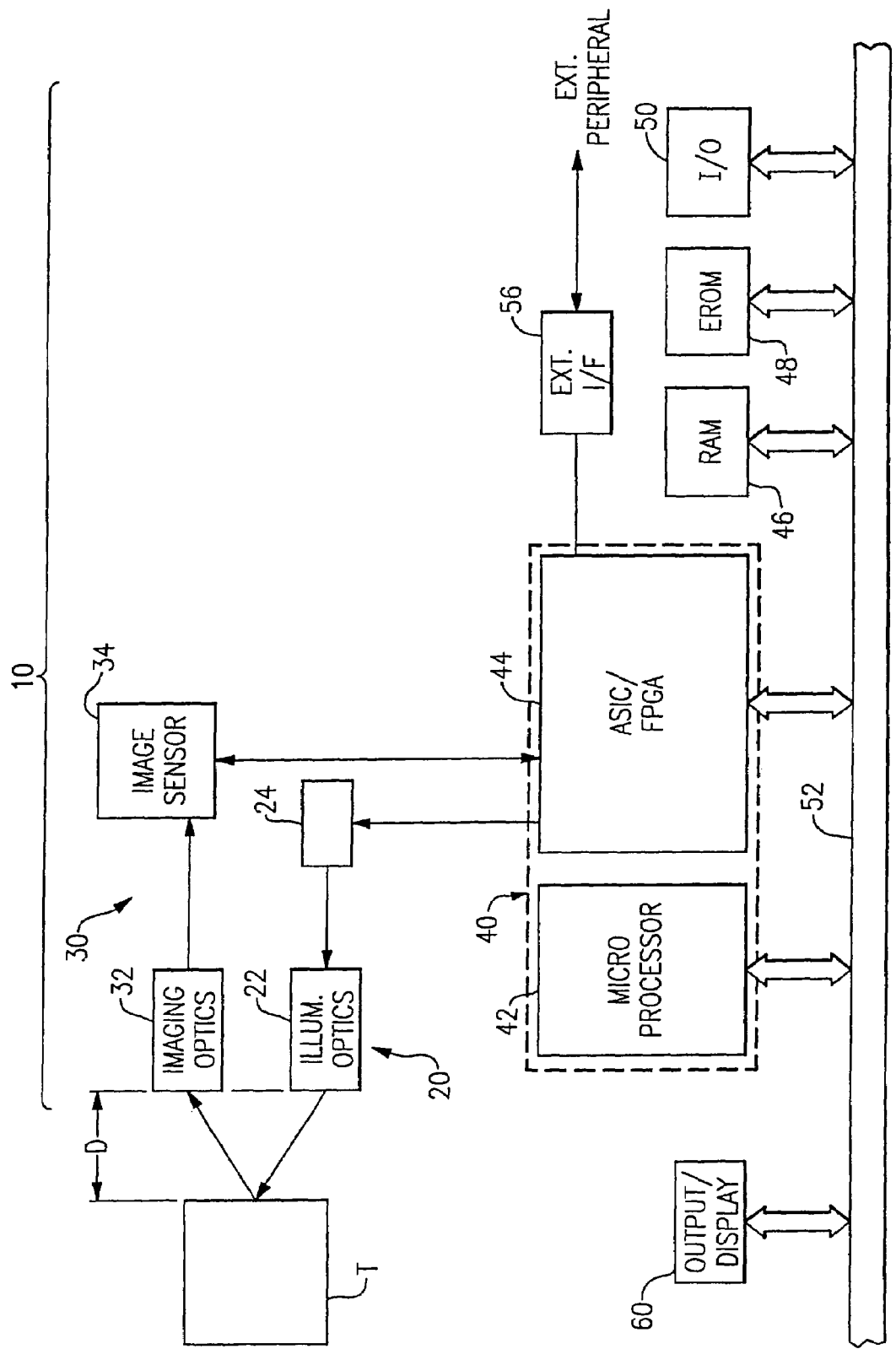
FIG. 2 is a block diagram of the electro-optical assembly of the optical reader of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the optical reader of the present invention is shown in FIG. 1, and is designated generally throughout by reference numeral 10.

In accordance with the invention, the present invention for an optical reader includes a color imaging assembly for acquiring color imaging data. An image analysis circuit determines if the acquired image includes at least one graphical symbol. A processing circuit processes the imaging data based on the determination of whether the image includes at least one graphical symbol. The present invention allows a user to read graphical symbols, such as bar codes, text, OCR characters or signatures using a color imager. The color optical reader of the present invention is configured to automatically determine whether a color image includes a graphical symbol, or is merely a color photographic image. The optical reader of the present invention also is operative to associate one acquired image with at least one subsequently acquired image.

As embodied herein, and depicted in FIGS. 1A-1D, perspective views of the optical reader in accordance with various embodiments of the present invention are disclosed. FIG. 1A shows the underside of hand held wireless optical reader 10. FIG. 1B shows the top of the optical reader depicted in FIG. 1A. Optical reader 10 includes housing 100, antenna 102, window 104 and trigger 12. Window 104 accommodates illumination assembly 20 and imaging assembly 30. As shown in FIG. 1B, the top side of reader 10 includes function keys 14, alphanumeric key pad 16, and display 60. In one embodiment, function keys 14 include an enter key and up and down cursor keys. FIG. 1C is also a hand held wireless optical reader 10. Reader 10 includes function keys 14, alphanumeric key pad 16, writing stylus 18, display 60, and signature block 62. Stylus 18 is employed by a user to write his signature in signature block 62. FIG. 1D shows yet another embodiment of optical reader 10 of the present invention. In this embodiment, reader 10 includes a gun-shaped housing 100. Display 60 and keypad 16 are disposed on a top portion of gun-shaped housing 100, whereas trigger 12 is disposed on the underside of the top portion of housing 100. Housing 100 also includes window 104 that accommodates illumination assembly 20 and imaging assembly 30. Wire 106 is disposed at the butt-end of housing 100. Wire 106 provides optical reader 10 with a hard wired communication link for external devices such as a host processor or other data collection devices.

As embodied herein and depicted in FIG. 2, a block diagram of the electro-optical assembly of optical reader 10 of the present invention is disclosed. Optical reader 10 includes illumination assembly 20 and color imaging assembly 30, connected to processor 40. Illumination assembly 20 includes illumination optics 22 coupled to light source 24. Light source 24 is coupled to ASIC/FPGA 44. ASIC/FPGA 44 is programmed to drive light source 24. Imaging assembly 30 includes imaging optics 32 and color imager 34. Imaging optics 32 focuses the illumination light reflected from target T onto color imager 34. Color imager 34 provides color imaging data to ASIC/FPGA 44. Color imager 34 performs several functions. Color imager 34 generates analog color image signals using an imaging array color filter. The array color filter pattern is a Bayer-pattern. The analog color imaging data is converted into a digital format using an internal A/D converter which also functions as a quantizer. An 8-bit system provides 256 brightness levels, whereas a 12-bit converter provides over 4,000 brightness levels. Digital color imaging data is transmitted from imager 34 to ASIC/FPGA 44 and processor 42.

Optical reader 10 also includes processor 40. In the embodiment depicted in FIG. 2, processor 40 includes microprocessor 42 and ASIC 44. System bus 52 couples microprocessor 40, RAM 46, EROM 48, I/O circuit 50 and display 60.

Illumination optics 22 may be of any suitable type, but there is shown by way of example a lens system for directing light from light source 24 towards target T. It will be apparent to those of ordinary skill in the pertinent art that modifications and variations can be made to illumination optics 22 of the present invention depending on the complexity of the target illumination. For example, illumination optics 22 may include one or more lenses, diffusers, wedges, reflectors or a combination of these elements. In one embodiment, illumination optics 22 produces an aiming pattern on target T.

Light source 24 may be of any suitable type, but there is shown by way of example a plurality of white LEDs. It will be apparent to those of ordinary skill in the pertinent art that modifications and variations can be made to light source 24 of the present invention depending on the application. For example, illumination assembly 20 may be eliminated altogether if it is certain that the ambient light level will be high enough to obtain high quality color images. In another embodiment, red LEDs are employed instead of the white LEDs.

Color imager 34 may be of any suitable type, but there is shown by way of example, a CMOS color imager having an 640×480 pixel resolution. It will be apparent to those of ordinary skill in the pertinent art that modifications and variations can be made to color imager 34 of the present invention depending on cost and the resolution required by optical reader 10. In another embodiment, color imager 34 has 800× 600 pixels. A typical VGA resolution of 640×480 pixels is adequate for displaying color images on a LCD or a computer monitor. In one megapixel embodiment, color imager 34 has 1156×864 pixels (almost 1-million pixels). In yet another embodiment, color imager 34 includes 1536×1024 pixels. One of ordinary skill in the art will recognize that as the resolution of imager 34 increases, so will the cost. In another embodiment, color imager 34 is implemented by scanning a linear CCD array. In other embodiments, color imager 34 is implemented using an area CCD solid state image sensor.

Processor 40 may be of any suitable type, but there is shown by way of example a processor which includes microprocessor 42 and ASIC 44 coupled to system bus 52. In one embodiment, microprocessor 42 and ASIC are programmable control devices that receive, process, and output data in accordance with an embedded program stored in EROM 48.

As discussed above, microprocessor 42 and ASIC 44 are connected to system bus 52, which includes address, data, and control lines.

In the embodiment depicted in FIG. 2, microprocessor 42 is an off-the-shelf VLSI integrated circuit (IC) microprocessor. Microprocessor 42 is tasked with the over-all control of the electro-optics shown in FIG. 2. Processor 42 controls menu operations, command and data received from I/O circuit 50, data written to display 60, and operating system functions. I/O circuit 50 controls the information received from keypad 14 and keypad 16. Microprocessor 42 is also tasked with processing and decoding imaging data stored in RAM 46 in accordance with the programming instructions stored in EROM 48. Thus, microprocessor 42 performs bar code decoding, optical character recognition, signature verification, and color image processing.

In the embodiment depicted in FIG. 2, ASIC 44 is implemented using a programmable logic array (PLA) device. In a similar embodiment, ASIC 44 is implemented using a field programmable gate array (FPGA) device. ASIC 44 is tasked with controlling the image acquisition process, and the storage of image data. As part of the image acquisition process, ASIC 44 performs various timing and control functions including control of light source 24, control of color imager 34, and control of external interface 56.

It will be apparent to those of ordinary skill in the pertinent art that modifications and variations can be made to processor 40 of the present invention depending on the cost, availability, and performance of off-the-shelf microprocessors, and the type of color imager used. In one embodiment, microprocessor 42 and ASIC 44 are replaced by a single microprocessor 40. In one embodiment, microprocessor 40 is implemented using a single RISC processor. In yet another embodiment, microprocessor 40 is implemented using a RISC and DSP hybrid processor.

It will be apparent to those of ordinary skill in the pertinent art that modifications and variations can be made to the memory configuration of the present invention depending on cost and flexibility considerations. For example, in one embodiment, EROM 48 is implemented using EPROMs or $E^2$PROMs. In yet another embodiment, FLASH memory is employed. RAM 46 typically includes at least one volatile memory device, and in some embodiments includes one or more long term non-volatile memory devices.

It will be apparent to those of ordinary skill in the pertinent art that modifications and variations can be made to I/O unit 50 of the present invention depending on the application and work environment. Embodiments of I/O unit 50 include an RS-232 interface, a LAN interface, PAN interface, a serial bus such as USB, an internet interface, and a wireless interface.

External interface 56 is used to transmit a discrete signal to control a peripheral device. Typically, the peripheral is an external illuminator. The external illuminator is used in place of light source 24.

It will be apparent to those of ordinary skill in the pertinent art that modifications and variations can be made to the operating system employed by optical reader 10 depending on the applications and desired operating environment. In one embodiment, a WindowsCE operating system is employed. In other embodiments, LINUX or PalmOS operating systems are employed. As a non-limiting example, application programs can be written using C, $C^{++}$, Visual Basic, or Visual $C^{++}$. Other languages can be used as well, depending on the application program. In other embodiments, optical reader 10 does not employ an operating system. For example, the simple reader depicted in FIG. 1D does not require a complex operating system.

Figure 3:
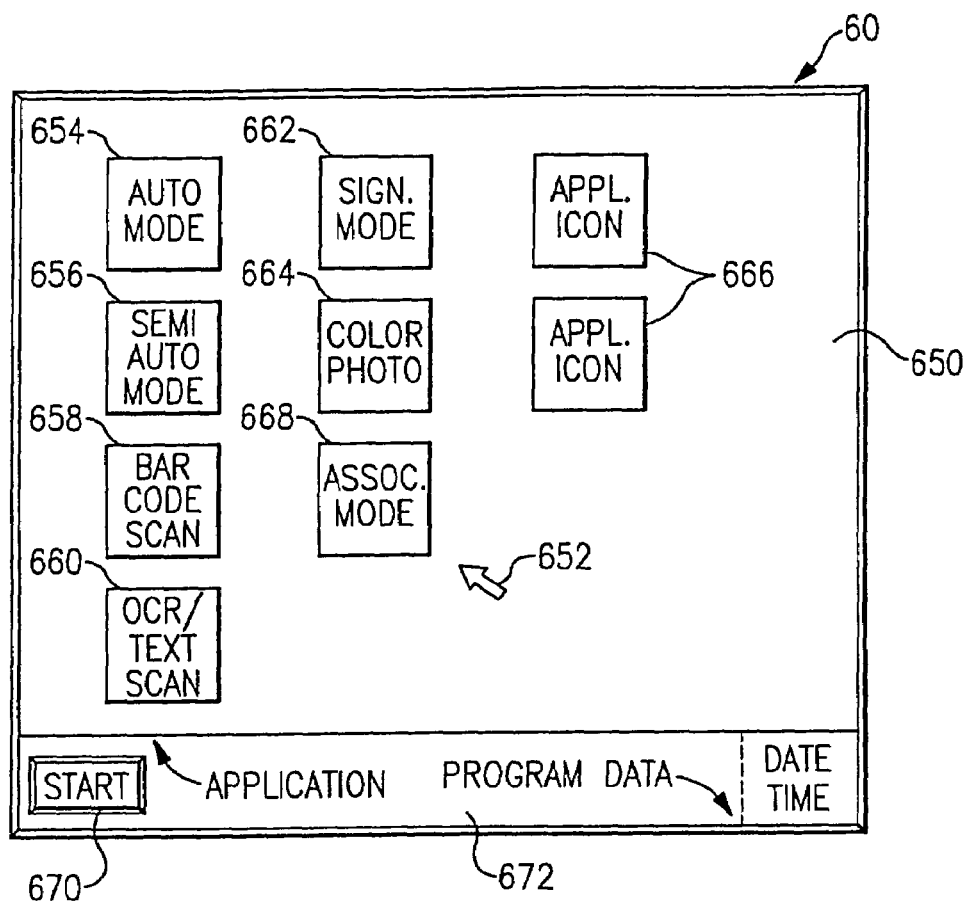
FIG. 3 is an example of a graphical user interface display in accordance with the present invention.

As embodied herein and depicted in FIG. 3, an example of a graphical user interface in accordance with the present invention is disclosed. Display 60 provides a plurality of application program icons displayed on graphical user interface (GUI) 650. Selections are made by the user via arrow 652. For example, GUI 650 allows a user to select the automatic image capture mode by clicking on automatic mode icon 654. GUI 650 also includes semi-automatic image capture icon 656, bar-code scanning icon 658, OCR/text capture icon 660, signature capture mode icon 662, color photography mode icon 664, association mode icon 668, and additional application program icons 666. The application program icon 666 may allow the user to collect other biometric information such as finger and voice prints. In the WindowsCE environment, start button icon 670 and tool bars may also be displayed on GUI 650. GUI 650 also displays current application program data 672.

In the Automatic imaging mode, processor 40 is programmed to analyze the color imaging data to determine if an acquired image includes a graphical symbol or is merely a color photographic image. If it makes the determination that the color image includes a graphical symbol, it further analyzes the acquired image and classifies it as a bar code, OCR symbol, text, or a signature. Based on the classification, optical reader 10 jumps to the appropriate routine in EROM 48. The semi-automatic mode is similar. Thus, in the automatic or semi-automatic modes, the bar code scanning mode, the OCR/text mode, the signature capture mode, the color photography mode, and the association mode are controlled by the application program, not by the user.

However, the user may manually select any of the above listed modes. If the user clicks on bar code scanning icon 658, the bar code scanning application program will run. In this application program, the user may select between a 1D bar code mode, 2D bar code mode or an autodiscrimination mode. Further, the user can manually select and de-select the types of bar codes optical reader 10 is enabled to read or not read.

The user may also click on OCR/Text icon 660. Clicking icon 660 provides the user with a check validation mode, a text scanning mode, or a bi-tonal image capture mode. The check validation mode is performed in conjunction with network services.

Clicking on icon 662 provides the user with a signature capture mode. In one embodiment, this mode includes a signature verification program wherein the user may select between a static verification or a dynamic verification. In the static mode, the user captures the image of a signature. The captured image is compared with a reference image stored in a remote database. In the dynamic mode, optical reader 10 uses the stylus and signature block to capture the signature. In this mode, signature block 62 measures unique dynamic parameters, such as applied pressure, direction and timing of movements, or a combination of these parameters. One of ordinary skill in the art will recognize that this list is not meant to be all-inclusive, but rather, is a representative example. The captured dynamic parameters are compared with a reference data stored in a remote database.

The user selects the color photography mode by clicking on icon 664. This mode allows the user to select an automatic imaging mode wherein optical reader 10 makes the imaging adjustments (e.g., exposure, etc.) or a manual mode that allows the user to adjust imager settings as he pleases.

In another embodiment, display 60 provides the user with a menu listing the main modes of optical reader 10. The user employs keypad 16 to select the desired mode. A cursor key is employed to highlight any of the modes listed above. Upon pressing the enter key, processor 40 jumps to the appropriate routine stored in EROM 48. As discussed above, a user may select between an Automatic Imaging mode, a Semi-Automatic Imaging mode, a bar code scanning mode, an OCR/text mode, a signature capture mode, a color photography mode, or an association mode.

Figure 4:
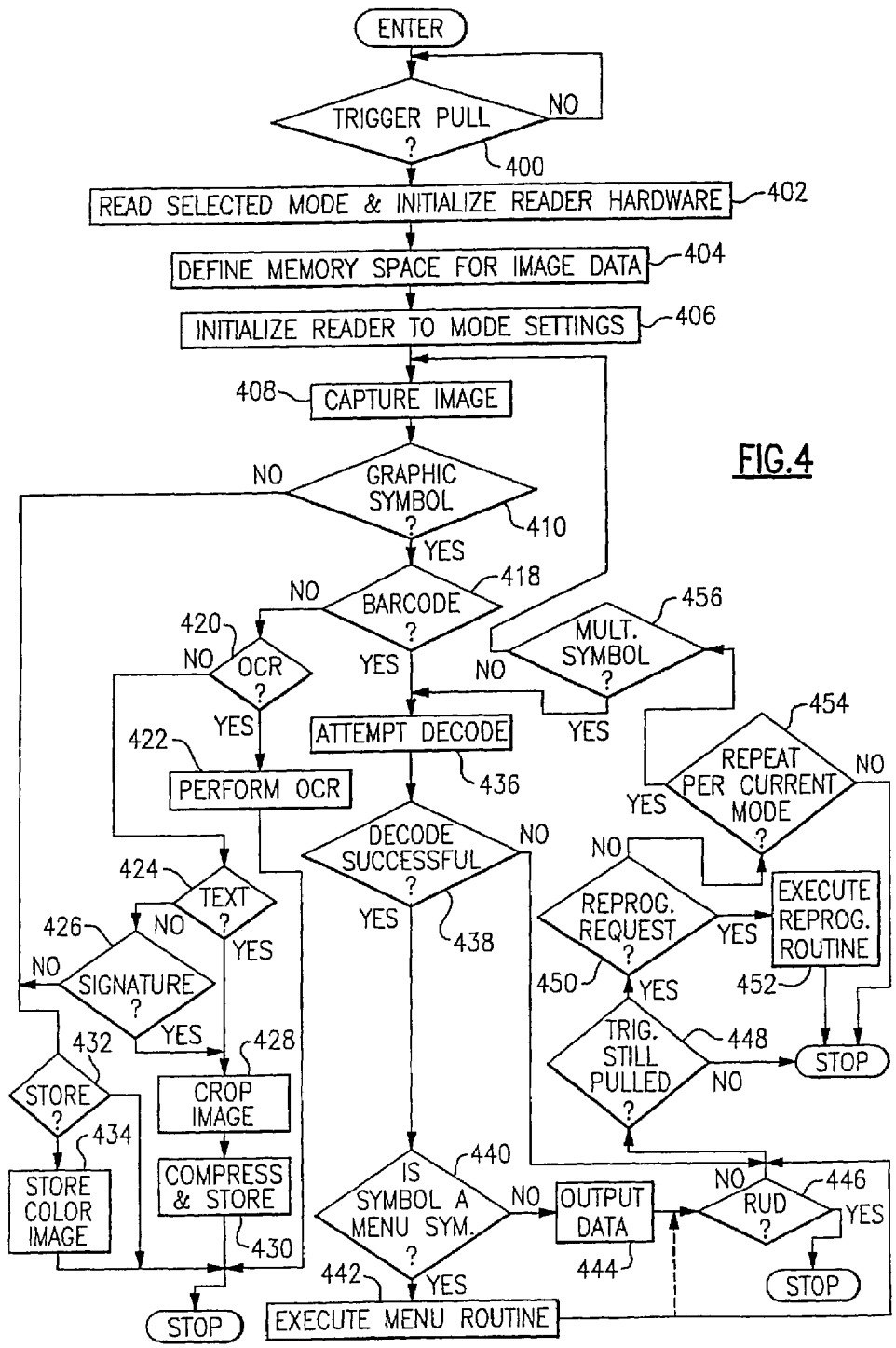
FIG. 4 is a flow chart showing the processing flow for an automatic mode in accordance with another embodiment of the present invention.

As embodied herein and depicted in FIG. 4, a flow chart showing the processing flow for the automatic imaging mode in accordance with another embodiment of the present invention is disclosed. After the user pulls the trigger in step 400, processor reads the selected mode. In this case the automatic mode has been selected by the user. The processor initializes optical reader 10 hardware, defines image data memory space, and initializes software mode settings. In step 408, optical reader 10 captures the image by obtaining color imaging data. In some embodiments, processor 40 may display the acquired image on display 60 during this step. In step 410, processor 40 determines if the captured image includes a graphical symbol. In one embodiment, processor 40 uses only a portion of the color imaging data to make this determination. Because there are more green pixels than either red or blue pixels in the Bayer-Pattern, processor 40 uses the green pixels to look for high energy regions in the acquired image. High energy, e.g. black-white transitions are a good indicator for the presence of a graphical symbol, such as a bar code symbol. A black and white bi-tonal image will consist of green pixels that are in one of two possible value ranges. One narrow range of values is representative of white portions of the image, whereas the other narrow range of values is representative of black portions of the image.

In another embodiment, step 410 is performed by considering all of the pixel values. However, the interpretation of the pixel's value is adjusted based on whether it is a red, green, or blue pixel. In another embodiment, processor 40 creates a gray-scale image to determine whether the image includes a graphical symbol.

If in step 410 processor 40 determines that there is no graphical symbol present in the image, the user is asked in step 432 if he desires to store the image. If so, the color photographic image is stored in memory in step 434. If processor 40 determines that the image includes a graphical symbol, the process flow moves on to step 418. In this step, processor 40 strikes scanning lines to locate bar code symbol identifiers. If processor 40 determines that the graphical symbol is a bar code symbol it attempts to decode the symbol in step 436. If the decoding is successful, the symbol may be a menu symbol or a data symbol. If it is a data symbol, the decoded value of the bar code symbol is output to the display. If it is a menu symbol, a menuing routine is executed. The menu symbol is discussed in more detail below.

If processor 40 does not locate a bar code symbol it moves onto step 420 and looks for OCR-A or OCR-B characters. If it finds these characters it performs optical character recognition in step 422. If it does not, processor evaluates the image for the presence of text. If text is located, the image is cropped, and the text is compressed and stored in steps 428 and 430. If the image does not include text, processor 40 evaluates the image for the presence of a signature. If one is present, the image is cropped, and the data is compressed and stored in steps 428 and 430. In another embodiment, optical reader 10 is networked, and processor 40 communicates with remote network resources to provide signature verification services. If processor 40 cannot detect a bar code symbol, OCR symbols, text, or a signature, the user is asked in step 432 if he desires to store the image. If he does, the color photographic image is stored in memory in step 434.

Figures 5, 5A:
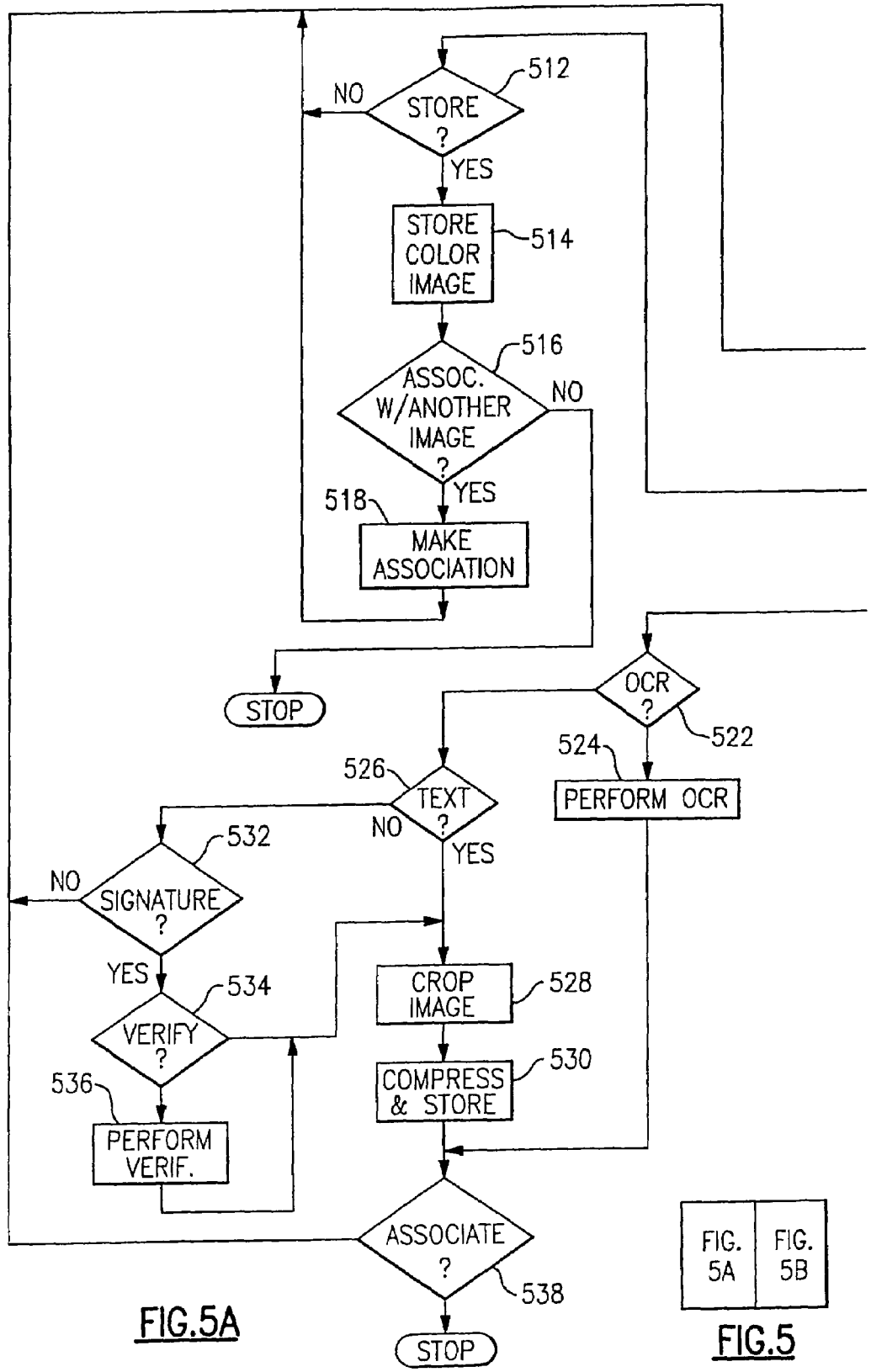
FIG. 5A-5B is a flow chart showing the processing flow for a semi-automatic mode in accordance with another embodiment of the present invention.
Figure 5B:
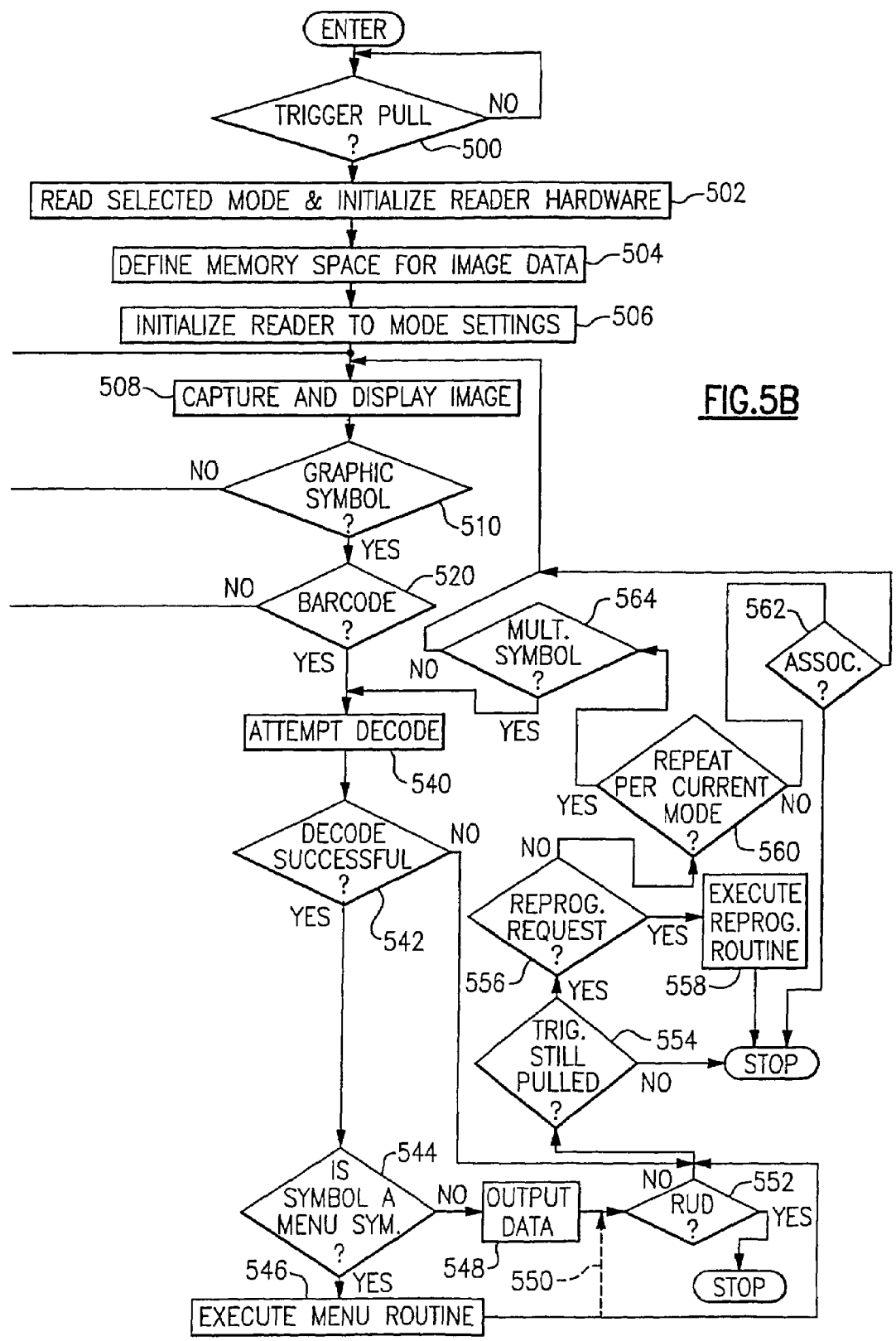

As embodied herein and depicted in FIG. 5, a flow chart showing the processing flow for the semi-automatic mode is disclosed. After the user pulls the trigger in step 500, processor reads the selected mode, initializes optical reader 10 hardware, defines image data memory space, and initializes software mode settings. In step 508, optical reader 10 captures and displays the image.

In step 510, processor 40 determines if the captured image includes a graphical symbol. Step 510 in the semi-automatic mode is identical to step 410 in the automatic mode. If processor 40 determines that the captured image does not include a graphical symbol, processor 40 asks the user if she wants to store the color image. If so, the color image is stored in step 514. In step 516, a prompt asks the user if he desires to associate the color image with another image. This step is not performed in the automatic mode. In step 518, if the user answers in the affirmative, the association is made and the processing flow returns to step 508.

In steps 520, 522, 526, and 532, the user is given the opportunity to select the type of graphical imaging that is to be performed. The method for performing OCR, text capture, and signature capture and/or verification are discussed above in the automatic mode description with one difference. In the semi-automatic mode, the user is asked in step 538 if he desires to associate the processed image with a subsequent captured image. If so, process flow is directed back to step 508 and another image is captured and displayed. The association feature can be used several times to associate multiple images.

If the user indicates that it is a bar code, an attempt is made to decode the symbol in step 540. Referring back to step 540, if the decoding attempt is successful, processor 40 determines in step 544 if the symbol is a menu symbol. If it is not a menu symbol, processor 40 displays the decoded bar code information on display 60. If it is a menu symbol, processor 40 executes the appropriate menu routine in step 546. In steps 552 to 564, processor 40 may continue to capture images if the trigger is continuously pulled. In step 562, the user is asked if he desires to associate the decoded bar-code with another image. If so, the program flow is directed back to step 508 and another image is captured and displayed. Processor 40 links this image to the decoded bar code information.

As embodied herein and depicted in FIG. 6A-6C, graphical depictions of the menu symbol used in the bar code processing flows depicted in FIG. 4 and FIG. 5 are disclosed. A decoded menu symbol includes menu word 600 which has the format depicted in FIG. 6A. Menu word 600 includes a one byte product ID code 600-1, that identifies the type and model of the optical reader. Field 600-2 of word 600 specifies the op-code. The op-codes are depicted in FIG. 6C. Op-code 0, refers to vector processing operations that are listed as A1-A4 in FIG. 6C. Vector processing allows the user to download, enabled codes, the parameter table, or current software to an external device. Op-codes 1-7 allow a user to modify a specific portion of the parameter table. These op-codes are used in conjunction with the offset field 600-3 and data fields 600-4 to 600-7. Offset field 600-3 is an index relative to the base address of the parameter table in memory that specifies the exact location in the parameter table. The data fields 600-4 to 600-7 are used to specify a bit mask that indicates which bits are to be modified. FIG. 6B depicts a second important group of options. For example, reader operating modes are included in F1-F6. These options are identical to the icons displayed on GUI 650 in FIG. 3. Offset field 600-3 accommodates other optical reader 10 options as shown.

Figure 7:
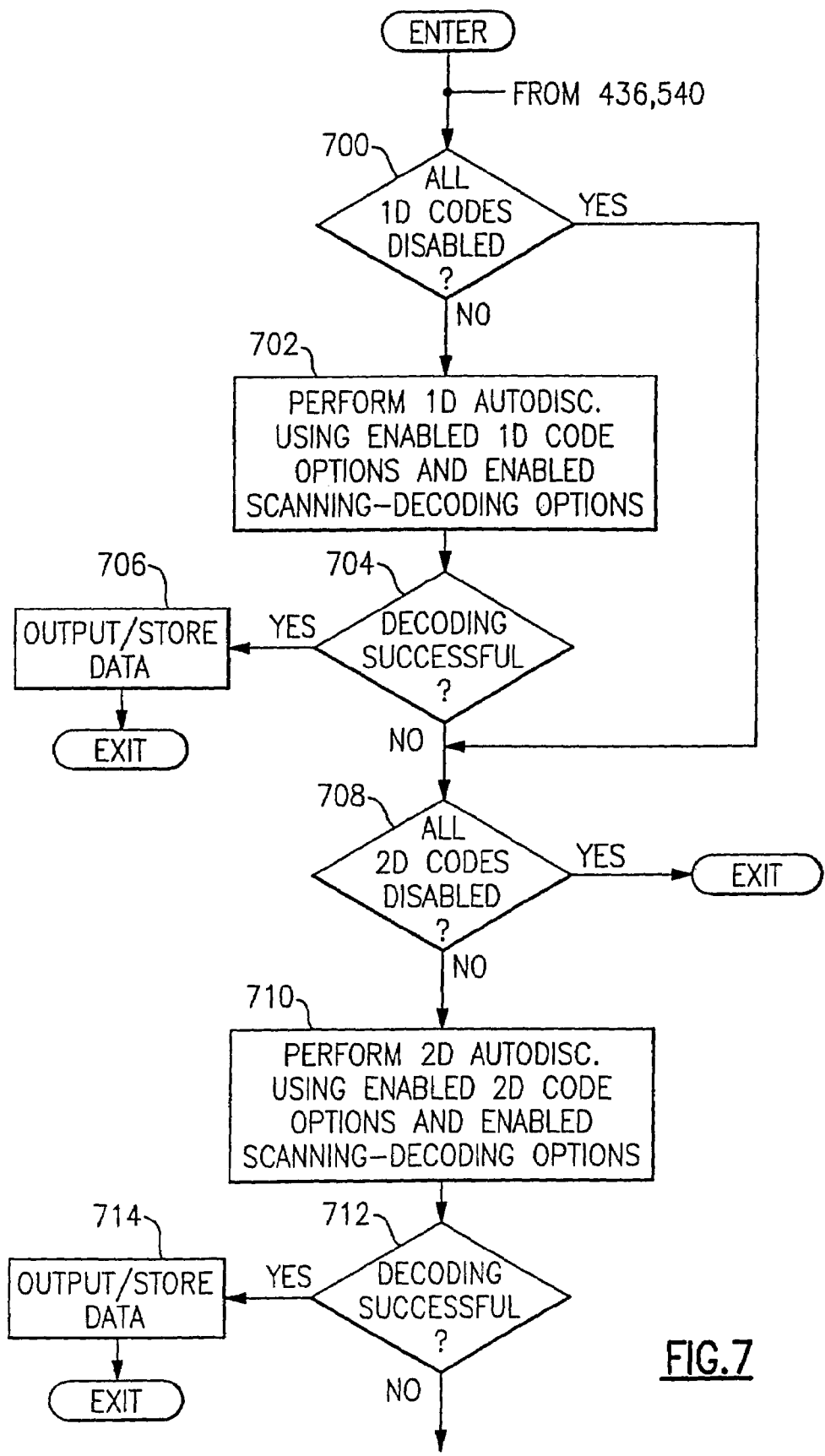
FIG. 7 is a flow chart showing a method for reading a bar code in accordance with yet another embodiment of the present invention.

As embodied herein and depicted in FIG. 7, a flow chart showing a method for reading a bar code in accordance with yet another embodiment of the present invention is disclosed. In step 700, processor 40 refers to a parameter table stored in EROM 48. Specifically, processor 40 determines if the parameter table is programmed to perform 1D decoding. If the parameter table has enabled 1D processing, 1D autodiscrimination is performed. The parameter table specifies the values of the parameters that define the operational mode of the reader. Examples of these parameters include the size and frame rate of the color imager, codes that are enabled during bar code decoding, I/O communications protocols, OCR options, and others. If 1D decoding is successful, the decoded data is stored or displayed, in accordance with the parameter table settings. If 1D codes are disabled or if 1D decoding is unsuccessful, processor moves on to step 708. In this step, processor 40 determines if any 2D codes are enabled. If the parameter table has all of the 2D codes disabled, processor 40 exits the bar code decoding routine. If 2D codes are enabled, 2D autodiscrimination is performed in step 710. If decoding is successful, the decoded data is either stored or output, depending on the parameters stored in the parameter table. If decoding is unsuccessful, processor exits the routine.

Figure 8:
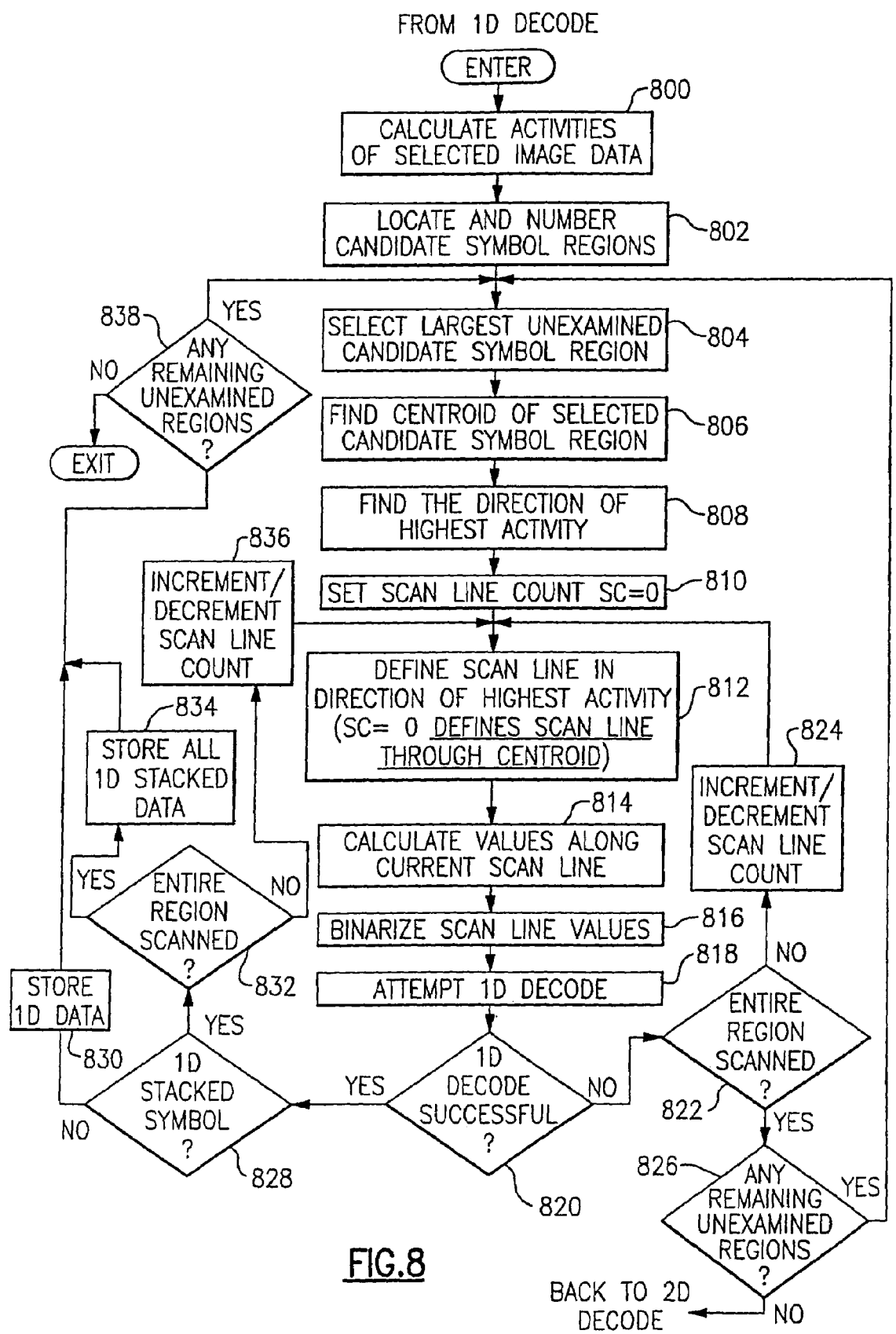
FIG. 8 is a flow chart showing a method for 1D autodiscrimination in accordance with the method depicted in FIG. 7.

As embodied herein and depicted in FIG. 8, a flow chart showing a method for performing the 1D autodiscrimination of step 702 in FIG. 7 is disclosed. In step 800 processor 40 calculates the activities of selected image data elements. The activity is defined as a measure of the rate of change of the image data over a small two-dimensional portion of the region surrounding the selected data element. In one embodiment, the activity is calculated along any two arbitrarily selected directions which are orthogonal one to the other. Two mutually perpendicular directions are used because the orientation of the symbol is unknown. In step 802, processor 40 looks for "high activity" regions. These high activity regions are referred to as candidate symbol regions(CSRs). A high activity region indicates a transition from a black region to a white region, or vice-versa. If there is more than one CSR, it may indicate the presence of more than one bar code symbol. In step 804, processor 40 selects the largest CSR. In step 806, processor 40 calculates the centroid of the largest CSR. Subsequently, processor 40 finds the direction of the highest activity in the largest CSR. In a 1D bar code, this will be the direction perpendicular to the direction of the bars. In steps 810 and 812, processor defines the initial scan line (SC=0), as being the scan line bisecting the centroid of the bar code. Processor calculates the brightness values of sampling points along the initial scan line. These brightness values are converted to digital data in step 816. In decoding step 818, processor 40 applies one 1D decoding program after another. If decoding is unsuccessful, processor 40 checks if the entire CSR has been scanned. If not, it establishes a new scan line, and repeats the decoding process. If in step 822, the entire CSR has been scanned, and there are no CSRs remaining to be decoded, processor 40 exits the routine. If in step 820, 1D decoding is successful, processor 40 determines if the symbol is a 1D stacked symbol. If it is a 1D stacked symbol, processor 40 scans and decodes the remaining CSRs in the stacked symbol. If it is not a stacked symbol, the decoded 1D data is stored or output to display 60 in step 830. In step 838, processor 40 determines if there any unexamined regions. If there are unexamined regions, the decoding process is repeated. Otherwise, processor 40 exits the routine.

Figure 9:
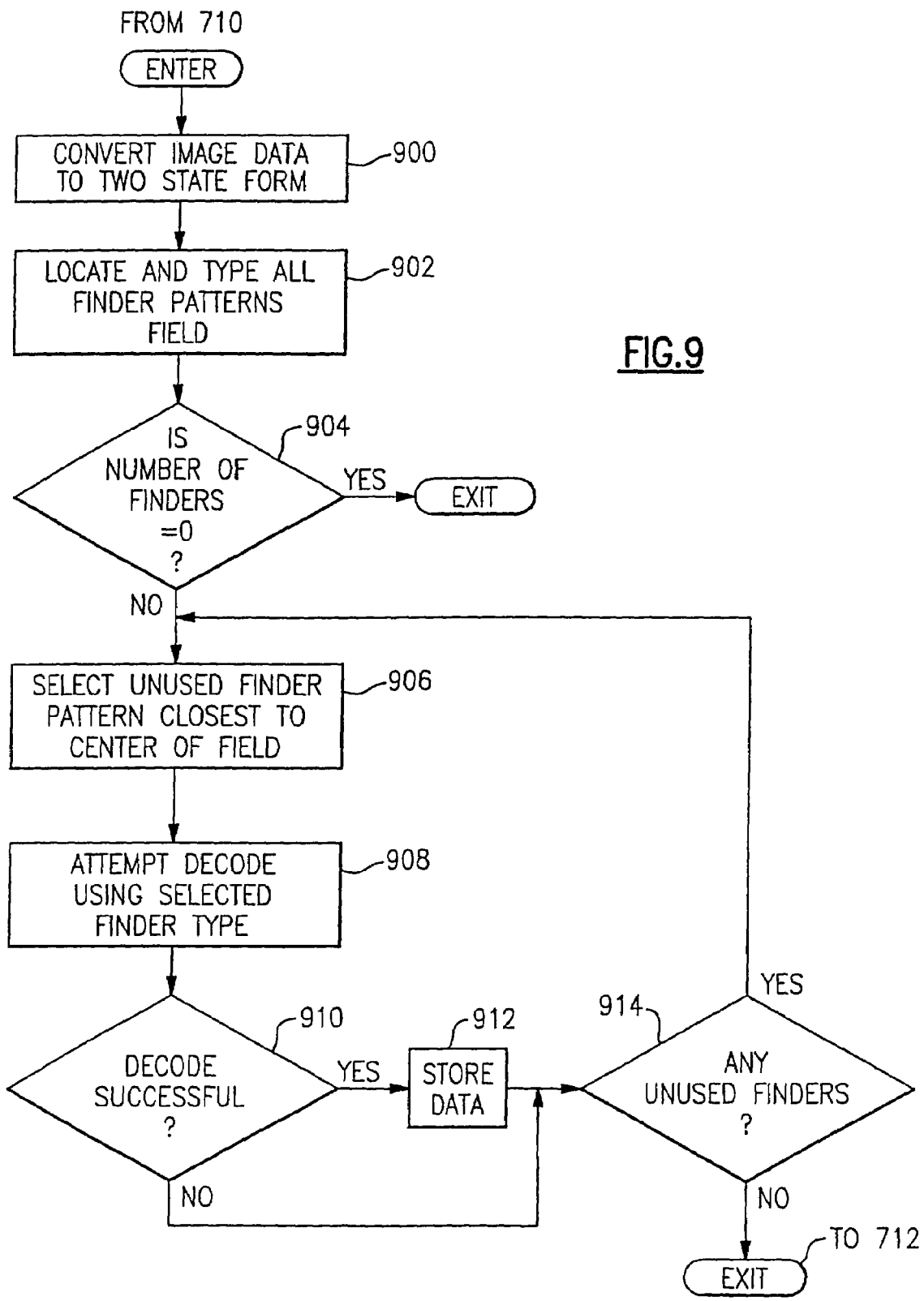
FIG. 9 is a flow chart showing a method for 2D autodiscrimination in accordance with the method depicted in FIG. 7.

As embodied herein and depicted in FIG. 9, a flow chart showing a method for 2D autodiscrimination is disclosed. In step 900, processor 40 converts the image data into a two-state binarized format. In step 902, processor 40 locates all 2D finder patterns and identifies them by type. Pattern types include bulls-eye type patterns, waistband type patterns peripheral patterns, and others. If the number of finder patterns equals zero, processor 40 exits the routine. If there are finder patterns, processor 40 locates the finder pattern closest to the center of the field of view in one embodiment of the invention. The closest-to-the-center option has an advantage in that a centrally located image is likely to be a symbol. In step 908, processor 40 attempts to decode the symbol in accordance with the finder type. For example, the Aztec 2D matrix symbol employs a bulls-eye finder pattern. The Data-Matrix symbology employs a peripheral finder pattern. If the decoding is successful, the decoded data is either stored or displayed. In step 914, processor 40 determines if there are any other unused finder patterns. If so, the symbols corresponding to those unused patterns are decoded, and the previously described steps are repeated. Otherwise, processor 40 exits the routine.

Figure 10:
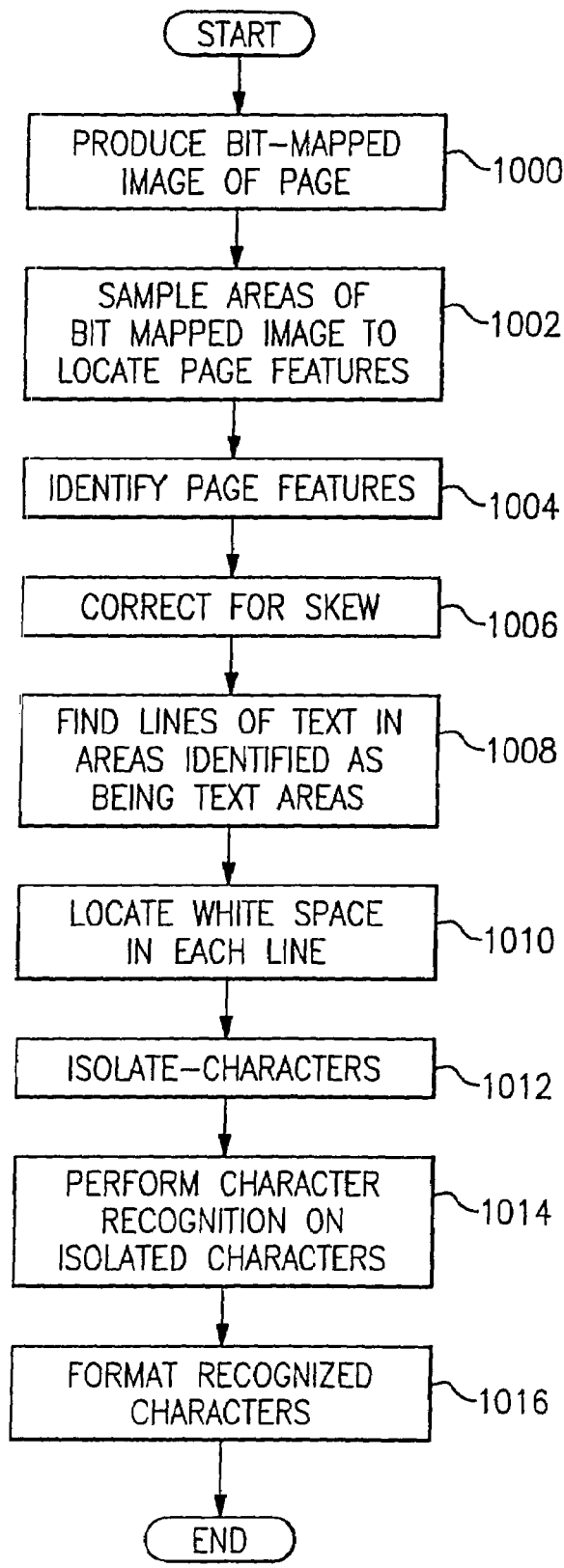
FIG. 10 is a flow chart showing a method for reading text in accordance with yet another embodiment of the present invention.

As embodied herein and depicted in FIG. 10, a flow chart showing a method for reading text in accordance with yet another embodiment of the present invention is disclosed. This routine can be accessed in a number of ways as described above. In step 1000, a bit-map image of the page is produced. In step 1002, the bit mapped image is sampled. In one embodiment, this is performed by analyzing every Nth scan line of the bit mapped image. The value of integer N is dependent on the resolution of the scanned image. In one embodiment the image is sampled every $\frac{1}{40}^{th}$ of an inch. This provides sufficient resolution to locate and classify the various regions on the page. By sampling every $\frac{1}{40}^{th}$ of an inch instead of every scan line, the processing and memory requirements of reader 10 are substantially reduced. In step 1004, processor 40 identifies the page features. Processor 40 analyzes the page and divides it into blank and non-blank portions. The non-blank portions are analyzed to distinguish text regions from non-text regions. After determining the layout of the page, processor 40 uses black-to-white transitions to determine degrees of skew. In step 1008, horizontal white spaces are identified to separate lines of text. In step 1010, vertical white spaces are identified within each line of text to thereby separate individual words and characters from each other. In step 1014, a character recognition algorithm is used in an attempt to recognize each individual character. Finally, in step 1016, processor 40 formats the recovered text before storing the text in memory.

Figure 11:
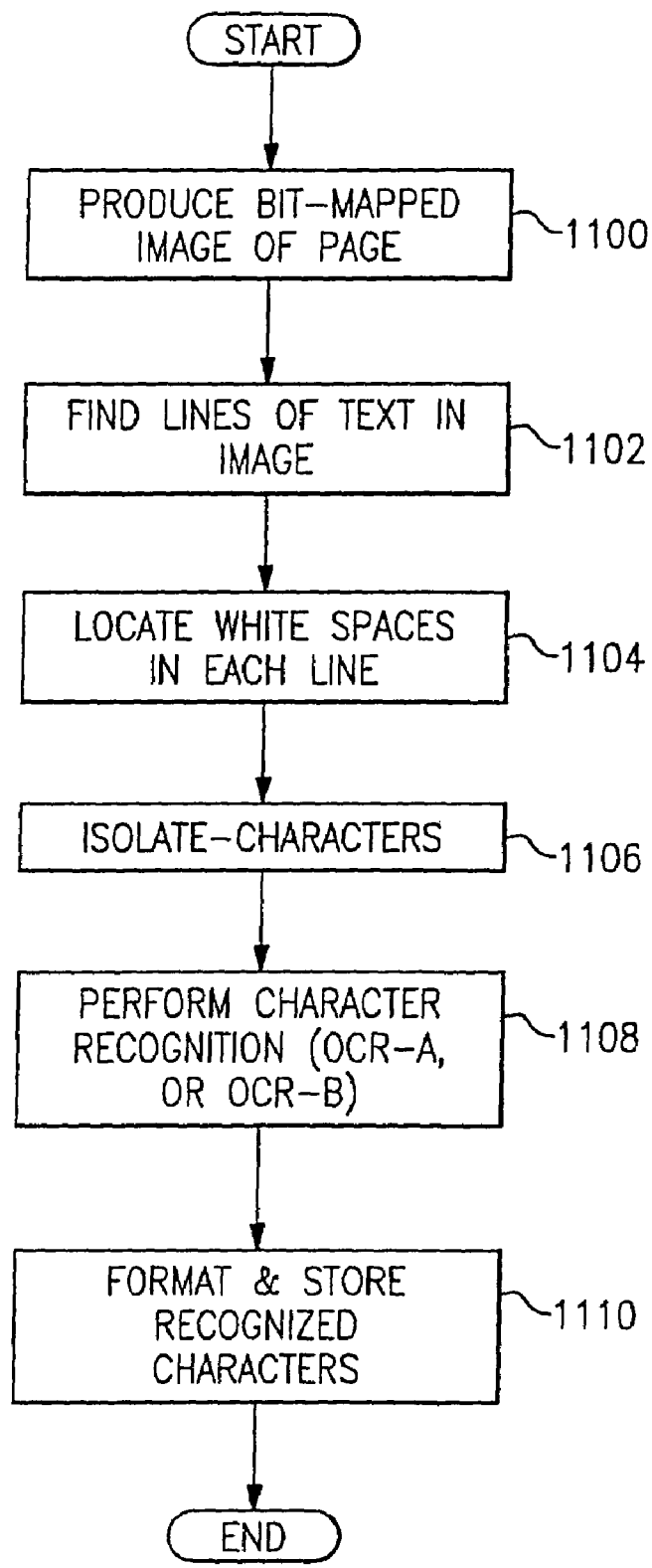
FIG. 11 is a flow chart showing a method for performing OCR in accordance with yet another embodiment of the present invention.

As embodied herein and depicted in FIG. 11, a flow chart showing a method for performing OCR in accordance with yet another embodiment of the present invention is disclosed. In step 1100, reader 10 produces a bit-mapped image of the page. Subsequently, processor 40 finds lines of text in the image, locates the white spaces in each line, and isolates the characters. In step 1108, processor 40 performs character recognition, either OCR-A or OCR-B, as desired. The decoded characters are stored in memory.

Figure 12:
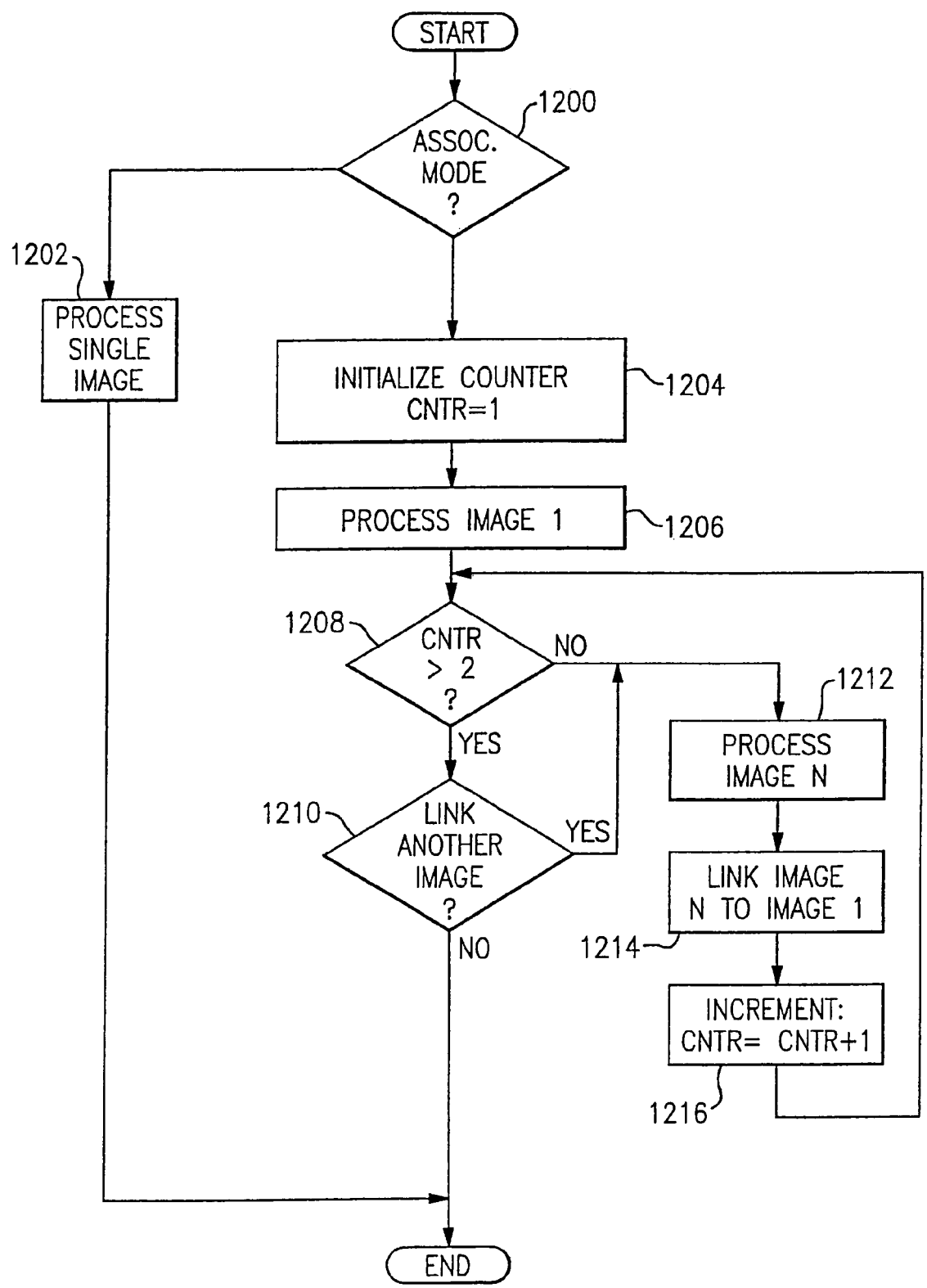
FIG. 12 is a flow chart showing a method for associating consecutive images taken with the color optical reader of the present invention.

As embodied herein and depicted in FIG. 12, a flow chart showing a method for associating consecutive images taken with the color optical reader of the present invention is disclosed. This method corresponds to icon 668 displayed on GUI 650 in FIG. 3. If icon 668 is not clicked on, processor 40 assumes that reader 10 is not operating in association mode. Thus, processor 40 will process a single image. If reader 10 is in association mode processor 40 initializes counter CNTR. In step 1206 processor 40 processes the first captured image. In step 1208, if CNTR is less than or equal to two, processor 40 processes image N, and links image N to the first image. In step 1216, CNTR is incremented by one. If CNTR is greater than two (step 1208), meaning that at least two images have already been linked, processor 40 asks the user if she desires to link another image. If so, the processing flow returns to step 1212. If not, processor 40 exits the routine.

Figure 13:
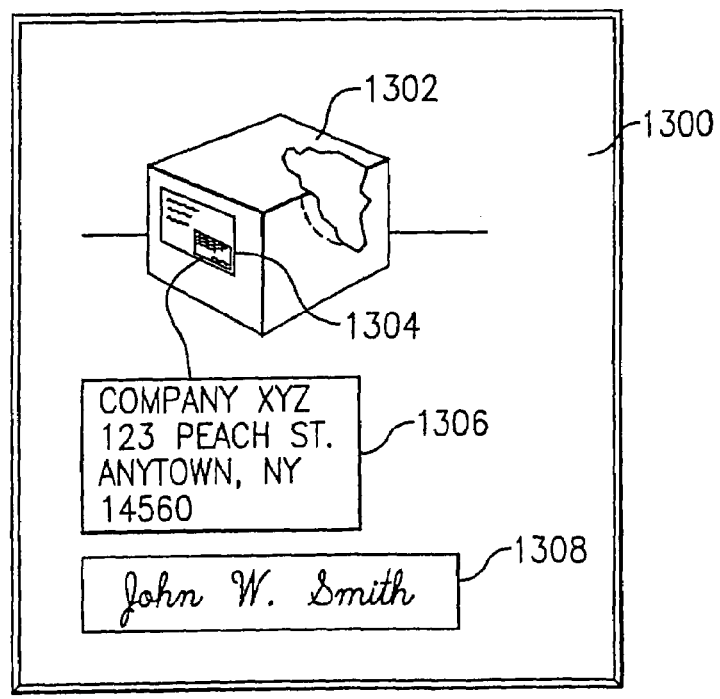
FIG. 13 is an example of image association in accordance with the present invention.

As embodied herein and depicted in FIG. 13, an example of image association in accordance with the present invention is disclosed. One or ordinary skill in the art will recognize that associated images 1300 can be disposed on paper, displayed electronically on display 60, or displayed electronically sing other electronic means, such as a computer monitor. In this example, the first image captured is color photograph 1302 which shows a damaged parcel. The second image captured is bar code 1304 affixed to the side of the damaged parcel. Processor 40 decodes bar code 1304 and associates decoded bar code data 1306 with color photograph 1302. In this example, the user elected to associate a third image, signature 1308. Thus, personnel viewing record 1300 may reasonably conclude that a damaged parcel was delivered to Company XYZ, and that the person signing for the parcel delivery was someone named John W. Smith.

As embodied herein and depicted in FIG. 14, a perspective view of a wireless color optical reader network 1400 in accordance with another embodiment of the present invention is disclosed. Network 1400 includes N-cordless optical scanners 10 coupled to base terminal 202 by means of radio link 18. Base terminal 202 is connected to host computer 206 by communications link 204. Cordless optical reader 10 is of the type described above. It includes antenna 102, keypads 14 and 16, and display 60. A radio controller is included in both the optical scanner 10 and the base terminal 202. It will be apparent to those of ordinary skill in the pertinent art that radio controller may be of any suitable type, but by way of example, radio controller 30 provides frequency hopping spread spectrum communications (FHSS) between scanner 10 and base terminal 202. FHSS is a form of spread spectrum radio transmission that produces a narrow band signal that hops among a plurality of frequencies in a prearranged pattern. FHSS is often used in commercial environments because of its ability to minimize errors due to interference or jamming. However, those of ordinary skill in the art will recognize that optical scanner 10 and base terminal 202 may communicate using other wireless schemes and other modulation formats based on user requirements and environmental factors. Base terminal 202 includes antenna 208, which is used to transmit and receive messages from optical scanner 10. Antenna 208 is connected to a radio controller disposed inside terminal 202. Base terminal 202 also includes an I/O card, a base terminal processor, and a base terminal memory. The I/O card in base terminal 202 is coupled to the radio controller and communications link 204.

As embodied herein and depicted in FIG. 15, a flow chart showing a method for transmitting packetized data from a color optical reader to a base station is disclosed. In steps 1500 and 1502, optical reader 10 captures an image and processes the image as described above. In step 1504, the processed image, whether it be a color image, decoded bar codes, a text file, or signature verification information, is assembled into packets. In steps 1506 and 1508, a loop is created wherein packets are sent to the base terminal one-by-one until all packets are sent.

As embodied herein and depicted in FIG. 16A and FIG. 16B, diagrammatic depictions of packet formats in accordance with the present invention are disclosed. In one embodiment of the present invention, each packet can accommodate approximately 200 bytes of decoded data in a 256 byte packet. This is merely a representative example, and one of ordinary skill in the art will recognize that the scope of the present invention should not be limited to data packets of a certain size or format. FIG. 16A shows data packet 1600 which is used to transmit decoded data from an optical reader to a base terminal when only one data packet is required. Packet 1600 includes an optical reader address field, sequence number field, a packet length field, an image type field, image data, and an error check field. The optical reader address identifies a particular optical reader. Each packet includes a sequence number disposed in the second field. The next field contains the length of the image data field. After this, the packet contains a field identifying the type of image that was processed. After the image type, the image data payload of the packet is inserted. Finally, packet 200 includes an error checking field.

FIG. 16B shows header packet 1602 and data packet 1604 used to transmit decoded data from an optical scanner to a base terminal when more than one data packet is required. When more than one packet is required, reader 10 first transmits header packet 1602. After base terminal 202 acknowledges that it can process the remaining packets, reader 10 transmits remaining packets 1604. If base terminal 202 cannot process the remaining packets 1604, or if there is another problem, base terminal 202 will transmit an application packet to scanner 10 indicating the error. The definitions of the scanner address field, the sequence number field, symbol type, length, symbol data, and error check field were described above, and hence, will not be repeated. Header packet 1602 also includes a header identification field, which identifies the packet as a header packet. In the next field, packet 1602 includes a total length field, which includes the total length of the data contained in the decoded symbol. The next field includes the total number of packets in the message. The second-to-last field is the packet number. In the header packet, this number is designated as packet number "one." The remaining packets 1604 also include a packet number field, which are incremented from 2 to N, depending on the total number of packets being transmitted in the message.

Packet 1600, packet 1602, and packet 1604 as described above may be of any suitable type, and are representative examples representing one embodiment of the present invention. One of ordinary skill in the art will recognize that the packets may be implemented in a variety of ways.

Figure 17:
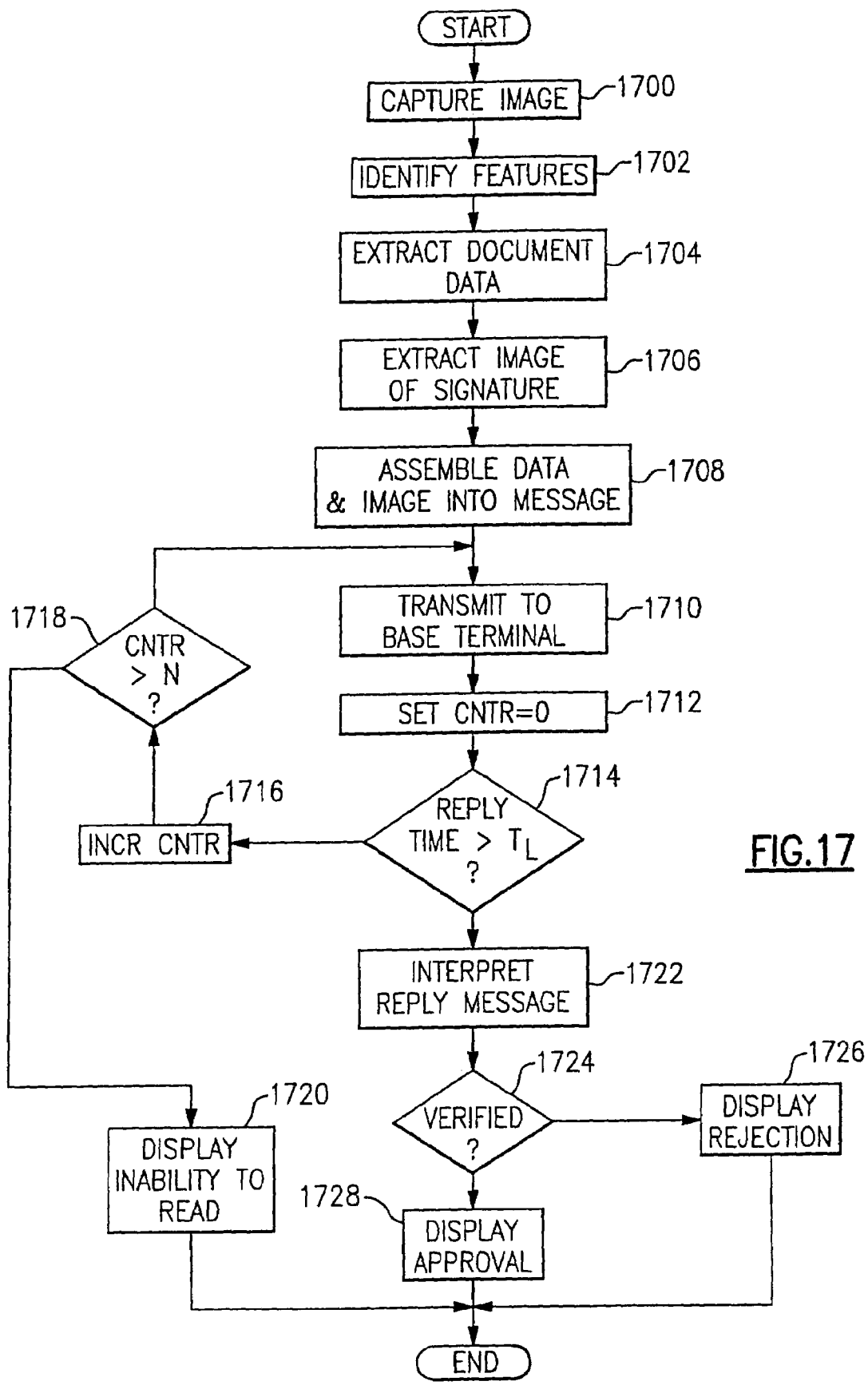
FIG. 17 is a flow chart showing a method for performing signature verification in accordance with yet another embodiment of the present invention.

As embodied herein and depicted in FIG. 17, a flow chart showing a method for performing signature verification is disclosed. In step 1700, optical reader 10 captures the image of the document to thereby generate a bit-map of the image. One of ordinary skill in the art will recognize that in the automatic mode or semi-automatic mode, processor 40 determines that the image object is a graphical symbol in a subsequent step. Step 1202 is similar to steps 1002 and 1004 of FIG. 10. The image is sampled by analyzing every Nth scan line of the bit mapped image. As discussed above, the image must be scanned in such a way so as to provide sufficient resolution to locate and classify the various regions on the document. In the case of a check, the location of the various fields on the instrument are relatively standard. Check sizes may differ somewhat, but the check number, bank code, account number, date, signature block, and etc. are in the same relative locations from check to check. In step 1704, document data such as the name, check number, bank code, account number, and date, are extracted from the document using any OCR program and stored in memory. In step 1706, the image of the hand writing in the signature block is captured.

Steps 1708 and 1710 are performed using the wireless system 1400 described above. In other embodiments these steps are performed by a wireline system. For example, in one embodiment, optical reader 10 is coupled to a host computer via an RS-232 or USB link. In another embodiment, optical reader 10 is connected to a host computer via a LAN. One of ordinary skill in the art will recognize that the present invention should not be construed as being limited by these examples.

In steps 1712 and 1714, processor 40 initializes a counter and begins waiting for a reply from the host computer. In steps 1714-1718, if the reply is not received within time limit $T_L$, the counter CNTR is incremented and the message is retransmitted. After several attempts, if CNTR>N (N being an integer), processor 40 outputs a fault message. If the reply message is received within time limit $T_L$, processor interprets the reply in step 1722. If the extracted data and the signature match information stored in the database accessible by the host computer, an approval message is displayed. If the extracted data and the signature do not match information stored in the database accessible by the host computer, a disapproval message is displayed. The dynamic signature verification embodiment is similar to the static embodiment described immediately above. In the dynamic version, the user provides his signature using stylus 18 and signature block 62, as shown in FIG. 1C. Signature block 62 provides processor 40 with the dynamic parameters recorded during signature. The dynamic parameters are transmitted to a host processor, as described above.

Figure 18:
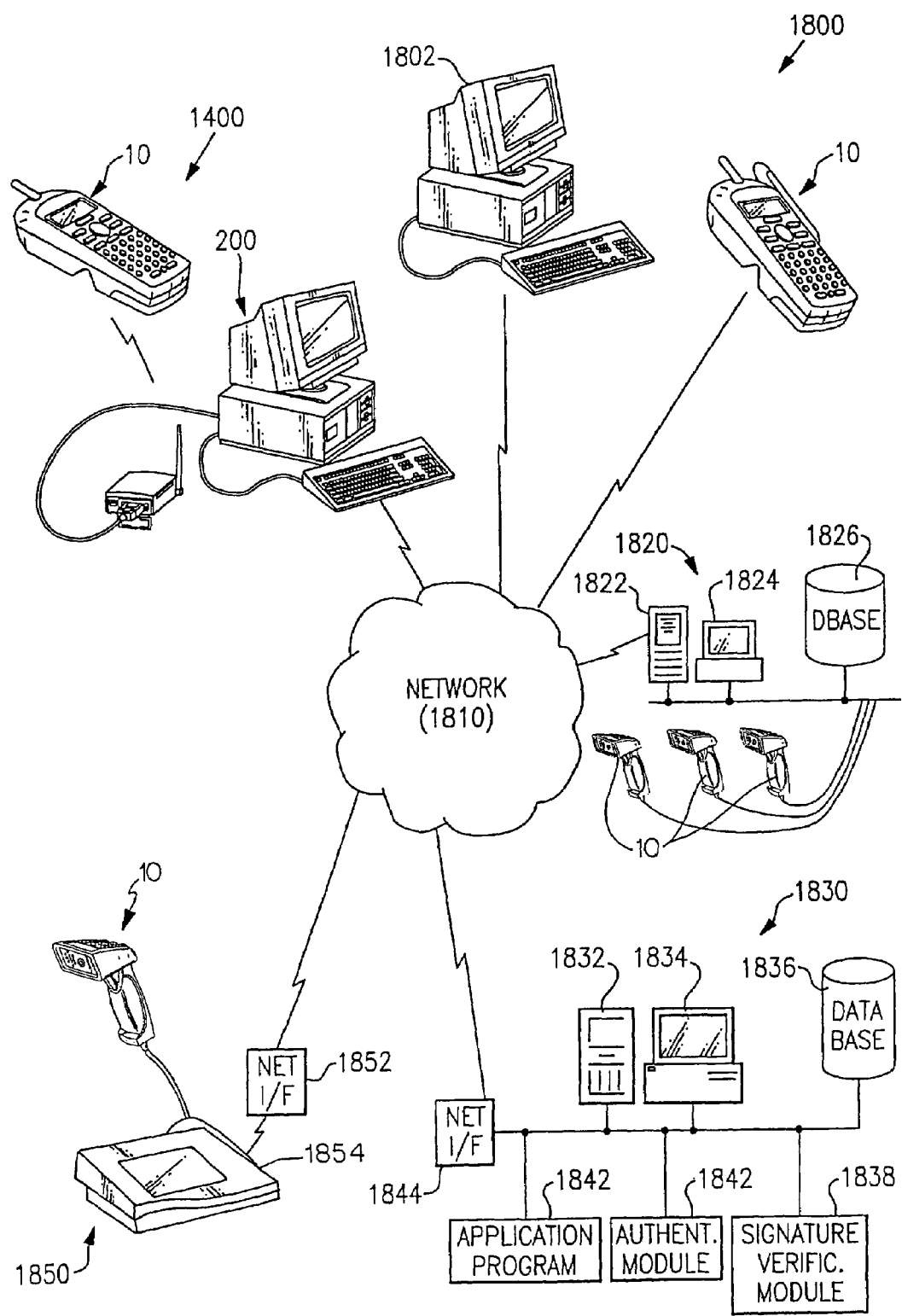
FIG. 18 is a diagrammatic depiction of color optical reader network applications in accordance with the present invention.

As embodied herein and depicted in FIG. 18, an example of a color optical reader network 1800 in accordance with the present invention is disclosed. Network 1800 includes wireless system 1400, personal computer 1802, optical reader 10, LAN 1820, network servicing center 1830, and personal area network (PAN) coupled together via network 1810.

One of ordinary skill in the art will recognize that network 1810 may be of any suitable type depending on the application, but there is shown by way of example the Internet. However, the present invention should not be construed as being limited to this example. In another embodiment, network 1810 is a private network. Those of ordinary skill in the art will also recognize that network 1810 is a wireline network in one embodiment, and a wireless network in another embodiment. Network 1810 may include circuit switched networks, IP networks, or both.

LAN 1820 includes server 1822, computer 1824, database 1826, and a plurality of optical readers 10. Database 1826 is used to store associated images along with other data fields. For example, it would be rather useful to store additional information with the associated images shown in FIG. 13. One may want to associate the delivery means, route, driver, and other related information for subsequent analysis. Network 1810 allows reader 10, PAN 1850, and wireless system 1400 a way to store such data in database 1826. System analysts can access this information via personal computer 1802 connected to network 1810. In one embodiment, LAN 1820 includes an Internet website. In this embodiment, users are authenticated before gaining access to database 1826.

Network servicing center 1830 is coupled to network 1810 via interface 1844. Center 1830 also includes server 1832, computer 1834, database 1836, signature verification module 1838, authentication module 1840, coupled together via a LAN. Center 1830 accommodates any number of useful applications programs 1842.

PAN 1850 includes at least one color optical reader 10 coupled to point-of-sale (POS) terminal 1854. POS terminal 1854 is coupled to network 1810 via interface 182. POS terminal 1854 includes a credit card reader and a signature capture block. In the scenario depicted in FIG. 18, a merchant user of POS terminal 1854 transmits an associated customer credit card number, signature, and in one embodiment, a color image of the customer, to Center 1830. Authentication module 1840 is used to authenticate the credit card and signature verification module is used to authenticate the signature. In another embodiment, database 1836 is used to store the customer's image, credit card number, and signature for verification purposes.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical reader that is configured for classifying an image, comprising:
   a color imaging assembly that is configured for obtaining a representation of an image in a digital format; and
   an image analysis component that is
   configured for classifying the image by evaluating a result of attempting to locate and process a portion of the image as graphical symbol, and
   configured for classifying said image as an image including a graphic symbol if attempting to locate and process a portion of the image as graphical symbol is successful, and
   configured for classifying said image as an image excluding a graphic symbol if attempting to locate and process a portion of the image as graphical symbol is unsuccessful.

2. The optical reader of claim 1, wherein classifying by attempting to locate and process a portion of the image as graphical symbol includes searching for high energy regions in the image.

3. The optical reader of claim 2, wherein high energy regions include black-white transitions.

4. The optical reader of claim 1, wherein attempting to locate and process a portion of the image as graphical symbol includes attempting to decode said portion of the image as a bar code symbol.

5. The optical reader of claim 4, wherein if said bar code symbol represents a menu, then if attempting to decode said bar code symbol is successful, then a menu that corresponds to a result of decoding of said bar code symbol is executed.

6. The optical reader of claim 4, wherein if said bar code symbol represents data, then if attempting to decode said bar code symbol is successful, then data that corresponds to a result of decoding said bar code symbol is output to a display.

7. The optical reader of claim 4, wherein if attempting to decode said bar code symbol is unsuccessful, then attempting to process a portion of the image as a graphical symbol further includes attempting to process said portion of said image as an optical character recognition (OCR) symbol.

8. The optical reader of claim 7, wherein if attempting to process said portion of said image as an optical character recognition symbol is successful, then a representation of said processed optical character recognition symbol is stored into a memory.

9. The optical reader of claim 7, wherein if attempting to process said portion of said image as an optical character recognition symbol is unsuccessful, then attempting to process a portion of the image as a graphical symbol further includes attempting to recognize said portion of said image as text.

10. The optical reader of claim 9, wherein attempting to recognize said portion of said image as text is successful, then said portion of said image is cropped and stored.

11. The optical reader of claim 10, wherein said portion of said image is further compressed after being cropped and before being stored.

12. The optical reader of claim 9, wherein attempting to recognize said portion of said image as text is unsuccessful, then attempting to process a portion of said image as a graphical symbol further includes attempting to recognize said portion of said image as a signature.

13. The optical reader of claim 12, wherein if attempting to recognize said portion of said image as a signature is successful, then said portion of said image is cropped and stored.

14. The optical reader of claim 12, wherein said portion of said image is further compressed after being cropped and before being stored.

15. The optical reader of claim 12, wherein if attempting to recognize said portion of said image as a signature is unsuccessful, then said image is classified as excluding a graphical symbol.

16. The optical reader of claim 13, wherein attempting to process a portion of the image as a graphical symbol further includes attempting to verify said signature.

17. The optical reader of claim 1 wherein attempting to process a portion of the image as graphical symbol is unsuccessful, then said image is classified as an image excluding a graphic symbol.

18. The optical reader of claim 1 wherein attempting to locate and process a portion of the image as graphical symbol is successful if at least one of attempting to decode a bar code symbol, attempting to process a OCR symbol, attempting to recognize text and attempting to recognize a signature, are successful.

19. The optical reader of claim 16 wherein said image is associated with another image that is subsequently captured.

20. A method for employing an optical reader to classify an image, the method comprising the steps of:
   providing an optical reader;
   configuring the optical reader to obtain a representation of an image in a digital format;
   configuring the optical reader to classify the image by attempting to locate and process a portion of the image as graphical symbol; and wherein
   if attempting to locate and process a portion of the image as graphical symbol is successful, then classifying the image as an image including a graphic symbol; and wherein
   if attempting to locate and process a portion of the image as graphical symbol is unsuccessful, then classifying the image as an image excluding a graphic symbol.

* * * * *